United States Patent
Tsukada

(10) Patent No.: US 8,633,992 B2
(45) Date of Patent: Jan. 21, 2014

(54) FOCUS DETECTION DEVICE, PHOTOGRAPHIC LENS UNIT, IMAGE-CAPTURING APPARATUS AND CAMERA SYSTEM

(75) Inventor: Shinichi Tsukada, Yokohama (JP)

(73) Assignee: Nikon Corporation, Tokyo (JP)

( * ) Notice: Subject to any disclaimer, the term of this patent is extended or adjusted under 35 U.S.C. 154(b) by 391 days.

(21) Appl. No.: 12/877,421

(22) Filed: Sep. 8, 2010

(65) Prior Publication Data
US 2011/0205423 A1  Aug. 25, 2011

(30) Foreign Application Priority Data

Sep. 9, 2009   (JP) .................................. 2009-208189
Sep. 6, 2010   (JP) .................................. 2010-198865

(51) Int. Cl.
*H04N 5/228*    (2006.01)
*H04N 3/00*     (2006.01)

(52) U.S. Cl.
USPC ....... 348/208.12; 348/326; 348/353; 348/365

(58) Field of Classification Search
USPC .................... 348/208.12, 326, 345, 353, 365, 348/E3.048, E5.045
See application file for complete search history.

(56) References Cited

U.S. PATENT DOCUMENTS 5,119,235 A * 6/1992 Umeda et al. ................. 359/619
5,517,273 A   5/1996 Tsukada
5,602,615 A * 2/1997 Muramatsu et al. .......... 396/228
5,854,948 A * 12/1998 Tsukada ........................ 396/93
2008/0258039 A1 * 10/2008 Kusaka ...................... 250/201.8

FOREIGN PATENT DOCUMENTS

| JP | A-6-148515 | 5/1994 |
| JP | A-6-214285 | 8/1994 |
| JP | A-2007-121896 | 5/2007 |
| JP | A-2008-268403 | 11/2008 |
| JP | A-2010-026011 | 2/2010 |

OTHER PUBLICATIONS

Feb. 7, 2012 Office Action issued in Japanese Patent Application No. 2010-198865 (with translation).

* cited by examiner

*Primary Examiner* — Hung Lam
(74) *Attorney, Agent, or Firm* — Oliff & Berridge, PLC

(57) ABSTRACT

A focus detection device includes: a focus detection unit that includes a pair of light-receiving element arrays and lens systems via which a pair of focus detection light fluxes are each guided to one of the pair of light-receiving element arrays, and detects an image shift amount based upon output signals output from the pair of light-receiving element arrays; an acquisition unit that obtains a plurality of sets of opening data pertaining to sizes and positions of a plurality of openings; a function value calculation unit that calculates, based upon the plurality of sets of opening data, a function value pertaining to a gravitational center distance between gravitational centers of a pair of overlapping areas where a pair of specific focus detection pupils overlap an exit pupil; and a conversion unit that converts the image shift amount to a defocus amount based upon the function value.

11 Claims, 14 Drawing Sheets

FOCUS DETECTION DEVICE, PHOTOGRAPHIC LENS UNIT, IMAGE-CAPTURING APPARATUS AND CAMERA SYSTEM

INCORPORATION BY REFERENCE

The disclosures of the following priority applications are herein incorporated by reference: Japanese Patent Application No. 2009-208189 filed Sep. 9, 2009 and Japanese Patent Application No. 2010-198865 filed Sep. 6, 2010.

BACKGROUND OF THE INVENTION

1. Field of the Invention

The present invention relates to a focus detection device that detects the focusing condition of a photographic lens, a photographic lens unit, an image-capturing apparatus and a camera system.

2. Description of Related Art

As disclosed in Japanese Laid Open Patent Publication No. 2007-121896, a focus detection device known in the related art, with the center of the entrance pupil set on the optical axis of a photographic lens, executes focus detection based upon a phase difference (image shift) manifested by a pair of pupil images on the image-capturing plane. In order to determine a defocus amount based upon the extent of image shift having been detected, the focus detection device calculates the distance between the gravitational centers of the pair of pupil images (pupil gravitational center distance).

SUMMARY OF THE INVENTION

The focus detection device disclosed in Japanese Laid Open Patent Publication No. 2007-121896 is capable of calculating the pupil gravitational center distance with a high level of accuracy through geometrical operation. However, such geometrical operation requires weighted integration of the light quantity distribution manifested by the pair of pupil images in correspondence to the position taken within the range assumed for the exit pupil of the photographic lens. Since this weighted integration must be executed each time a change occurs in correspondence to the focus detection area, the focal length of the photographic lens or the aperture value at the photographic lens, the focus detection is bound to require a significant length of time, and thus, the pursuit of measures for speeding up the processing is an on-going endeavor.

According to the 1st aspect of the present invention, a focus detection device comprises: a focus detection unit that includes a pair of light-receiving element arrays and lens systems via which a pair of focus detection light fluxes obtained by pupil-splitting transmitted light transmitted through a photographic optical system are each guided to one of the pair of light-receiving element arrays, and detects an image shift amount based upon output signals output from the pair of light-receiving element arrays by adopting a split-pupil phase method; an acquisition unit that obtains a plurality of sets of opening data pertaining to sizes and positions of a plurality of openings that restrict the transmitted light at the photographic optical system; a function value calculation unit that calculates, based upon the plurality of sets of opening data, a function value pertaining to a gravitational center distance between gravitational centers of a pair of overlapping areas where a pair of specific focus detection pupils determined in correspondence to the lens systems and the pair of light-receiving element arrays at the focus detection unit overlap an exit pupil of the photographic optical system; and a conversion unit that converts the image shift amount to a defocus amount based upon the function value calculated by the function value calculation unit.

According to the 2nd aspect of the present invention, in the focus detection device according to the 1st aspect, it is preferred that the function value represents the gravitational center distance; the function value calculation unit calculates the gravitational center distance by substituting, in a quadratic expression pertaining to variables representing positions of two intersection points at which a straight line passing through the gravitational centers of the pair of overlapping areas intersect an outer edge of the exit pupil of the photographic optical system, variable values, determined based upon the plurality of sets of opening data obtained by the acquisition unit and position data indicating a position at which focus detection is executed on the light-receiving element arrays, for the variables; and the conversion unit converts the image shift amount to the defocus amount based upon a focus detection pupil distance to the pair of focus detection pupils from the lens systems and the gravitational center distance calculated by the function value calculation unit.

According to the 3rd aspect of the present invention, in the focus detection device according to the 1st aspect, it is preferred that the focus detection device further comprises a storage unit where a neural network that uses as input values thereof the plurality of sets of opening data obtained via the acquisition unit and position data indicating a position at which focus detection is executed on the pair of light-receiving element arrays is stored. The function value is a value indicating a ratio of a focus detection pupil distance to the pair of focus detection pupils from the lens systems and the gravitational center distance; and the conversion unit converts the image shift amount to the defocus amount based upon the value indicating the ratio.

According to the 4th aspect of the present invention, in the focus detection device according to the 1st aspect, it is preferred that the focus detection device further comprises a distance calculation unit that calculates, based upon the plurality of sets of opening data obtained via the acquisition unit, an intersection point distance between two intersection points at which a straight line passing through the gravitational centers of the pair of overlapping areas intersect an outer edge of the exit pupil of the photographic optical system. The function value is a value indicating a ratio of a focus detection pupil distance to the pair of focus detection pupils from the lens systems and the gravitational center distance; the function value calculation unit calculates the value indicating the ratio based upon the focus detection pupil distance and the intersection point distance; and the conversion unit converts the image shift amount to the defocus amount based upon the value indicating the ratio.

According to the 5th aspect of the present invention, in the focus detection device according to the 1st aspect, it is preferred that the lens systems are micro-lenses each disposed in correspondence to each of pairs of light-receiving elements constituting the pair of light-receiving element arrays.

According to the 6th aspect of the present invention, in the focus detection device according to the 1st aspect, it is preferred that the lens systems are a pair of image reforming lenses; and an optical image formed via the photographic optical system is reformed near each of the pair of light-receiving element arrays via the pair of image reforming lenses.

According to the 7th aspect of the present invention, an image-capturing apparatus comprises: a focus detection device according to the 4th aspect; an image sensor that includes a plurality of image-capturing light-receiving elements with three different sets of spectral sensitivity characteristics corresponding to a first wavelength band, a second wavelength band and a third wavelength band, which receive the transmitted light and output image signals corresponding to the three different sets of spectral sensitivity characteristics, and at which the pair of light-receiving element arrays are arrayed; and a correction unit that corrects the function value calculated by the function value calculation unit, based upon mean output values which each corresponds to each of the three different sets of spectral sensitivity characteristics and which indicate mean values of values output from the plurality of image-capturing light-receiving elements present within a nearby area around the pair of light-receiving element arrays on the image sensor. The function value calculation unit calculates the function value corresponding to light assuming a central wavelength band among the first wavelength band, the second wavelength band and the third wavelength band.

According to the 8th aspect of the present invention, a camera system comprises: a focus detection device; and a photographic lens unit equipped with a photographic optical system and a storage unit. The focus detection device includes; a focus detection unit that includes a pair of light-receiving element arrays and lens systems, via which a pair of focus detection light fluxes obtained by pupil-splitting transmitted light transmitted through the photographic optical system are each guided to one of the pair of light-receiving element arrays, and detects an image shift amount based upon output signals output from the pair of light-receiving element arrays by adopting a split-pupil phase method; an acquisition unit that obtains a plurality of sets of opening data pertaining to sizes and positions of a plurality of openings that restrict the transmitted light at the photographic optical system; a gravitational center distance calculation unit that calculates a gravitational center distance between gravitational centers of a pair of overlapping areas where a pair of specific focus detection pupils determined in correspondence to the lens systems and the pair of light-receiving element arrays at the focus detection unit overlap an exit pupil of the photographic optical system; and a conversion unit that converts the image shift amount to a defocus amount based upon a focus detection pupil distance from the lens systems to the pair of focus detection pupils and the gravitational center distance calculated by the gravitational center distance calculation unit. The gravitational center distance calculation unit calculates the gravitational center distance by substituting, in a quadratic expression pertaining to variables representing positions of two intersection points at which a straight line passing through the gravitational centers of the pair of overlapping areas intersect an outer edge of the exit pupil of the photographic optical system, variable values, determined based upon the plurality of sets of opening data obtained by the acquisition unit and position data indicating a position at which focus detection is executed on the light-receiving element arrays, for the variables; the quadratic expression includes the variables and a specific constant; the plurality of sets of opening data and the specific constant are stored in the storage unit; and when calculating the gravitational center distance, the gravitational center distance calculation unit reads out the specific constant from the storage unit.

According to the 9th aspect of the present invention, a photographic lens unit is included in a camera system according to the 8th aspect.

According to the 10th aspect of the present invention, a camera system comprises: a focus detection device; and a photographic lens unit equipped with a photographic optical system and a storage unit. The focus detection device includes; a focus detection unit that includes a pair of light-receiving element arrays and lens systems, via which a pair of focus detection light fluxes obtained by pupil-splitting transmitted light transmitted through the photographic optical system are each guided to one of the pair of light-receiving element arrays, and detects an image shift amount based upon output signals output from the pair of light-receiving element arrays by adopting a split-pupil phase method; an acquisition unit that obtains a plurality of sets of opening data pertaining to sizes and positions of a plurality of openings that restrict the transmitted light at the photographic optical system; a function value calculation unit that calculates a function value pertaining to a gravitational center distance between gravitational centers of a pair of overlapping areas where a pair of specific focus detection pupils determined in correspondence to the lens systems and the pair of light-receiving element arrays at the focus detection unit overlap an exit pupil of the photographic optical system; a distance calculation unit that calculates, based upon the plurality of sets of opening data obtained via the acquisition unit, an intersection point distance between two intersection points at which a straight line passing through the gravitational centers of the pair of overlapping areas intersect an outer edge of the exit pupil of the photographic optical system; and a conversion unit that converts the image shift amount to a defocus amount based upon the function value calculated by the function value calculation unit. The function value is a value indicating a ratio of a focus detection pupil distance from the lens systems to the pair of focus detection pupils and the gravitational center distance; the function value calculation unit calculates the value indicating the ratio based upon the focus detection pupil distance, the intersection point distance and a specific constant; and the conversion unit converts the image shift amount to the defocus amount based upon the value indicating the ratio; the plurality of sets of opening data and the specific constant are stored in the storage unit; and when calculating the value indicating the ratio, the function value calculation unit reads out the specific constant from the storage unit.

According to the 11th aspect of the present invention, a photographic lens unit is included in a camera system according to the 10th aspect.

According to the 12th aspect of the present invention, a photographic lens unit comprises: a photographic optical system; an opening unit that defines a plurality of openings via which transmitted light transmitted through the photographic optical system is restricted; and a storage unit where opening data pertaining to sizes and positions of the plurality of openings and specific constant data are stored. Based upon the opening data and the specific constant data, a function value, to be used when converting an image shift amount indicating an extent of image shift attributable to a pair of focus detection light fluxes obtained by pupil-splitting the transmitted light transmitted through the photographic optical system, to a defocus amount through a split-pupil phase-difference method, is obtained.

DESCRIPTION OF PREFERRED EMBODIMENTS

First Embodiment

Figure 1:
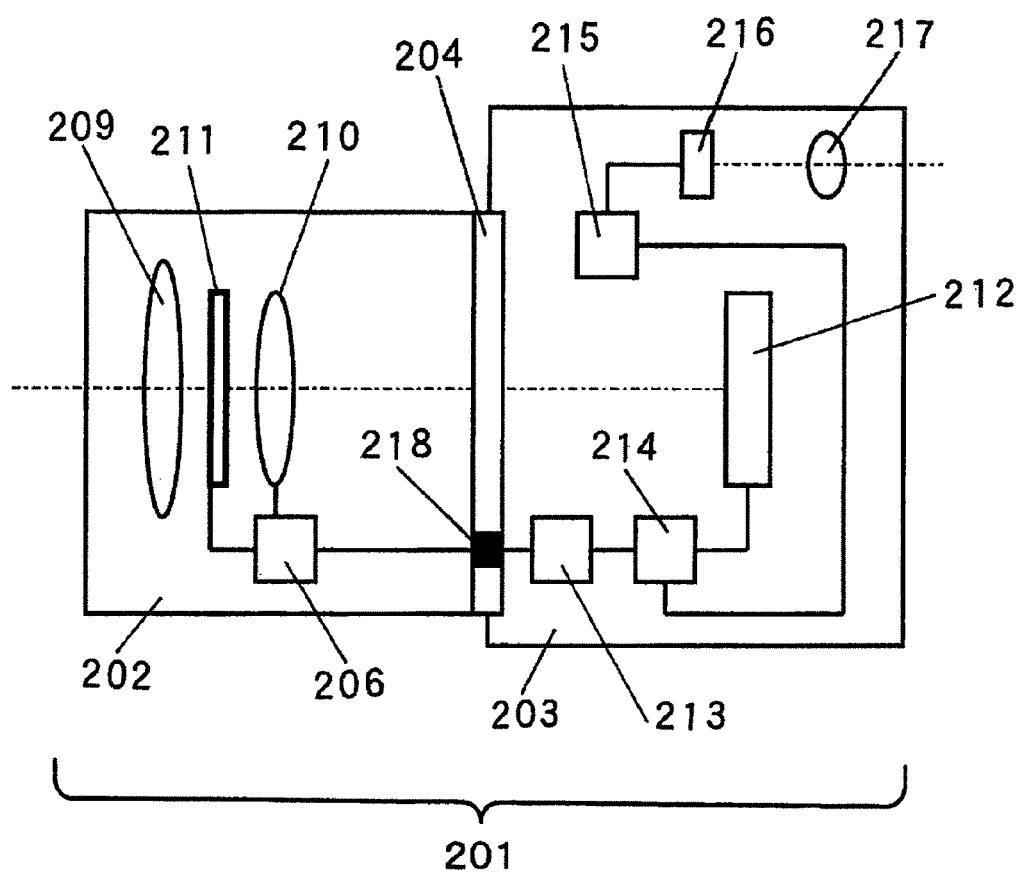
FIG. 1 is a sectional view of the overall structure adopted in a digital camera used in conjunction with interchangeable lenses, which is equipped with an image sensor achieved in an embodiment.

The focus detection device achieved in the first embodiment of the present invention is described. FIG. 1 is a sectional view showing the overall structure of a digital still camera used in conjunction with interchangeable lenses, which is equipped with the focus detection device achieved in the embodiment. The digital still camera 201 includes a camera body 203 and an interchangeable lens 202. The interchangeable lens 202 and the camera body 203 are connected with each other via a mount unit 204. The interchangeable lens 202 includes a lens 209 via which a subject image is formed, a focusing lens 210, an aperture 211 and a lens CPU 206 that controls drive of the focusing lens 210 and drive of the aperture 211.

Disposed at the camera body 203 are; an image sensor 212 assuming a specific position on a predetermined image forming plane of the interchangeable lens 202, a body CPU 214 that reads out image signals from the image sensor 212 and controls the overall operation executed in the digital still camera, a focus detection unit 213 that detects the focusing condition for the interchangeable lens 202 by receiving some of the image signals provided via the body CPU 214, a liquid crystal display element 216 for a liquid crystal viewfinder (EVF: electronic viewfinder), an eyepiece lens 217 through which the liquid crystal display element 216 is observed, a liquid crystal display element drive circuit 215 that drives the liquid crystal display element 216 at the liquid crystal viewfinder under control executed by the body CPU 214, and a storage device 219. The focus detection unit 213 and the lens CPU 206 exchange various types of information (the F number, the opening data required for conversion coefficient calculation, the defocus amount based upon which the lens is driven and the like) via an electrical contact point 218 at the mount unit 204. The opening data required for the conversion coefficient calculation may include a plurality of sets of circular opening data (each indicating the radius of a specific circular opening and the distance from the predetermined image forming plane to the particular circular opening) pertaining to circular openings that limit the photographic light flux.

The image sensor 212 includes a built-in light-receiving element array engaged in focus detection via micro-lenses, which is disposed over a plurality of areas each corresponding to one of a plurality of focus detection positions. A subject image formed on the image sensor 212 with light having passed through the interchangeable lens 202, undergoes photoelectric conversion at image-capturing pixels on the image sensor 212, which include image-capturing light-receiving elements, and is thus converted to image signals. An output from the image sensor 212, which includes the image signals, is provided to the body CPU 214, and the outputs from focus detection pixels in the light-receiving element array engaged in focus detection via micro-lenses are provided to the focus detection unit. The focus detection unit 213 engages in communication with the lens CPU 206 to read out opening data for the currently mounted lens and calculates a conversion coefficient and a focus detection light quantity information (a range-finding light quantity information) in correspondence to each of the plurality of focus detection positions based upon the opening data, focus detection pupil information (range-finding pupil information) held at the focus detection unit 213 and information on the plurality of focus detection positions. The opening data transmitted by the lens CPU 206 are stored in the storage device 207.

It is to be noted that the lens CPU 206 adjusts the opening data in correspondence to the focusing condition, the zooming condition and the aperture setting condition. More specifically, the lens drive control device 206 monitors the positions of the lenses 209 and 210 and the aperture setting at the aperture 211, and calculates the opening data based upon the monitored information. Alternatively, it may select the opening data corresponding to the monitored information from a lookup table prepared in advance. The focus detection unit 213 calculates the defocus amount based upon output signals corresponding to the intensity levels of the pair of pupil images. It is to be noted that the signals corresponding to the intensity levels of a pair of pupil images are output by a focus detection optical system that executes focus detection through a split pupil phase detection by using micro-lenses as described later.

After correcting the pair of image signals based upon the focus detection light quantity information in correspondence to each focus detection position, the focus detection unit 213 executes focus detection arithmetic processing of the known art so as to calculate an image shift amount indicating the extent of image shift manifested by the pair of images at each focus detection position. Next, it multiplies the image shift amount having been calculated in correspondence to each focus detection position by the conversion coefficient having been determined in correspondence to the particular focus detection position and thus calculates a defocus amount indicating an extent of defocus manifesting at the focus detection position. The focus detection unit 213 determines the ultimate defocus amount based upon the plurality of defocus amounts.

For instance, it may designate the defocus amount indicating the maximum close-up range, among the plurality of defocus amounts, as the ultimate defocus amount. As an alternative, it may designate the average value of the plurality of defocus amounts as the ultimate defocus amount. Upon deciding, based upon the ultimate defocus amount, that the lens needs to be driven (upon deciding that the camera is not in focus), the focus detection unit 213 transmits the ultimate defocus amount to the lens CPU. Based upon the defocus amount thus received, the lens CPU 206 calculates a lens drive quantity indicating the extent by which the lens is to be driven and then drives the focusing lens 210 to the focusing position based upon the lens drive quantity. The body CPU 214 generates display image signals based upon the signals output from the image sensor 212 and has an image expressed with these image signals brought up on display at the liquid crystal display element 216 via the liquid crystal display element drive circuit 215.

Figure 2:
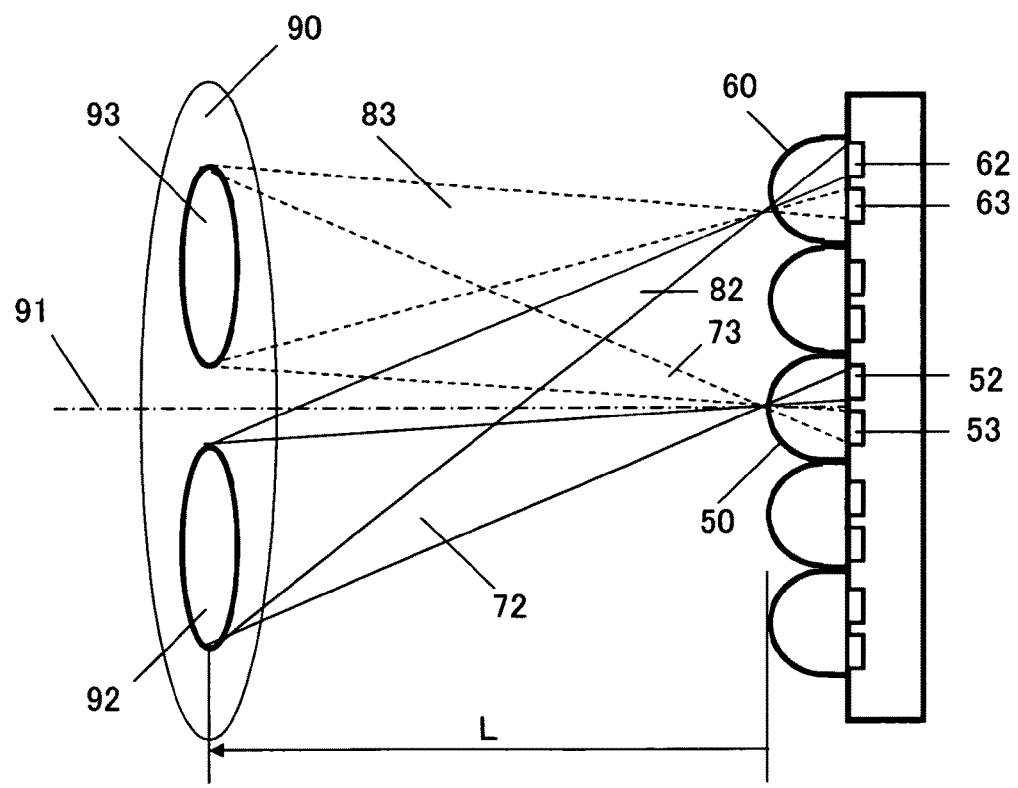
FIG. 2 shows the structure of a focus detection optical system adopting a split-pupil phase detection method whereby focus detection is executed via micro lenses.

FIG. 2 shows the structure of a focus detection optical system used to detect the focusing condition through the split-pupil phase detection method in conjunction with micro-lenses. An exit pupil 90 is set over a focus detection pupil distance (a range-finding pupil distance) L along the frontward direction from the micro-lenses disposed at the predetermined image forming plane of the interchangeable lens 202 (see FIG. 1). It is to be noted that the focus detection pupil distance L is determined in correspondence to the curvature of the micro-lenses, the refractive index of the micro-lenses, the distance between the micro-lenses and the photoelectric conversion units and the like. FIG. 2 also shows an optical axis 91 of the interchangeable lens 202, micro-lenses 50 and 60, pairs of photoelectric conversion units (52, 53) and (62, 63), each pair disposed at a specific focus detection pixel, and pairs of focus detection light fluxes (72, 73) and (82, 83). A focus detection pupil (a range-finding pupil) 92 is a range defined by the photoelectric conversion units 52 and 62 projected via the micro-lenses 50 and 60. A focus detection pupil (a range-finding pupil) 93 is a range defined by the photoelectric conversion units 53 and 63 projected via the micro-lenses 50 and 60.

While FIG. 2 provides a schematic illustration of a focus detection pixel (constituted with the micro-lens 50 and the pair of photoelectric conversion units 52 and 53) disposed on the optical axis 91 and a nearby focus detection pixel (constituted with the micro-lens 60 and the pair of photoelectric conversion units 62 and 63), focus detection light fluxes from the pair of focus detection pupils 92 and 93 and arriving at individual micro-lenses are received at the corresponding pairs of photoelectric conversion units in other focus detection pixels, as well. In other words, a pair of focus detection light fluxes formed by pupil-splitting the light transmitted through the interchangeable lens 202 with the pair of focus detection pupils 92 and 93 are guided via the micro-lens 50 to the pair of photoelectric conversion units 52 and 53 and are also guided via the micro-lens 60 to the pair of photoelectric conversion units 62 and 63.

It is to be noted that the focus detection pixels are arrayed in a direction matching the direction in which the pair of focus detection pupils are set side-by-side. The micro-lenses 50 and 60 are disposed near the predetermined image forming plane of the photographic optical system (equivalent to the interchangeable lens 202 in FIG. 1). Shapes of the pair of photoelectric conversion units 52 and 53 disposed behind the micro-lens 50 on the optical axis 91 are projected via the micro-lens 50 onto the exit pupil 90 set apart from the micro-lenses 50 and 60 by the focus detection pupil distance L, and the shapes of the projected photoelectric conversion units define the focus detection pupils 92 and 93.

In addition, shapes of the pair of photoelectric conversion units 62 and 63 disposed behind the micro-lens 60 near the micro-lens 50 are projected via the micro-lens 60 onto the exit pupil 90 set apart by the focus detection pupil distance L, and the shapes of the projected photoelectric conversion units define the focus detection pupils 92 and 93. Namely, the positional relationship between the micro-lens and the photoelectric conversion units at each focus detection pixel is determined so that the projected shapes (focus detection pupils 92 and 93) of the photoelectric conversion units at the various focus detection pixels are aligned on the exit pupil 90 located over the focus detection pupil distance L.

The photoelectric conversion unit 52 outputs a signal corresponding to the intensity of an image formed on the micro-lens 50 with the focus detection light flux 72 having passed through the focus detection pupil 92 and having advanced toward the micro-lens 50. The photoelectric conversion unit 53 outputs a signal corresponding to the intensity of an image formed on the micro-lens 50 with the focus detection light flux 73 having passed through the focus detection pupil 93 and having advanced toward the micro-lens 50.

In addition, the photoelectric conversion unit 62 outputs a signal corresponding to the intensity of an image formed on the micro-lens 60 with the focus detection light flux 82 having passed through the focus detection pupil 92 and having advanced toward the micro-lens 60. The photoelectric conversion unit 63 outputs a signal corresponding to the intensity of an image formed on the micro-lens 60 with the focus detection light flux 83 having passed through the focus detection pupil 93 and having advanced toward the micro-lens 60.

By linearly disposing a large number of focus detection pixels such as those described above and integrating the outputs from the photoelectric conversion units at the individual focus detection pixels into output groups each corresponding to one of the two focus detection pupils 92 and 93, information related to the intensity distribution of the pair of images formed on a focus detection pixel row with the individual focus detection light fluxes passing through the focus detection pupil 92 and the focus detection pupil 93 is obtained. Image shift detection arithmetic processing (correlation arithmetic processing, phase difference detection processing), to be detailed later, is subsequently executed by using the information thus obtained so as to detect the extent of image shift manifested by the pair of images through the split-pupil phase detection method. Then, by executing a specific type of conversion processing on the image shift amount, the deviation (defocus amount) of the current image forming plane (the actual image forming plane at the focus detection position set on the image-capturing plane), relative to the predetermined image forming plane (the position of the micro-lens array), is calculated.

In more specific terms, with s representing the image shift amount indicating the extent of image shift manifested by the image formed at the photoelectric conversion unit 52 or 62 and the image formed at the photoelectric conversion unit 53 or 63, and g representing the distance between the gravitational centers of the pair of images, i.e., the pupil gravitational center distance, the defocus amount def may be calculated as expressed in (1) below. It is to be noted that the conversion coefficient K is defined as; K=L/g.

$$def = \frac{L}{g} \cdot s = K \cdot s \qquad (1)$$

Figure 3:
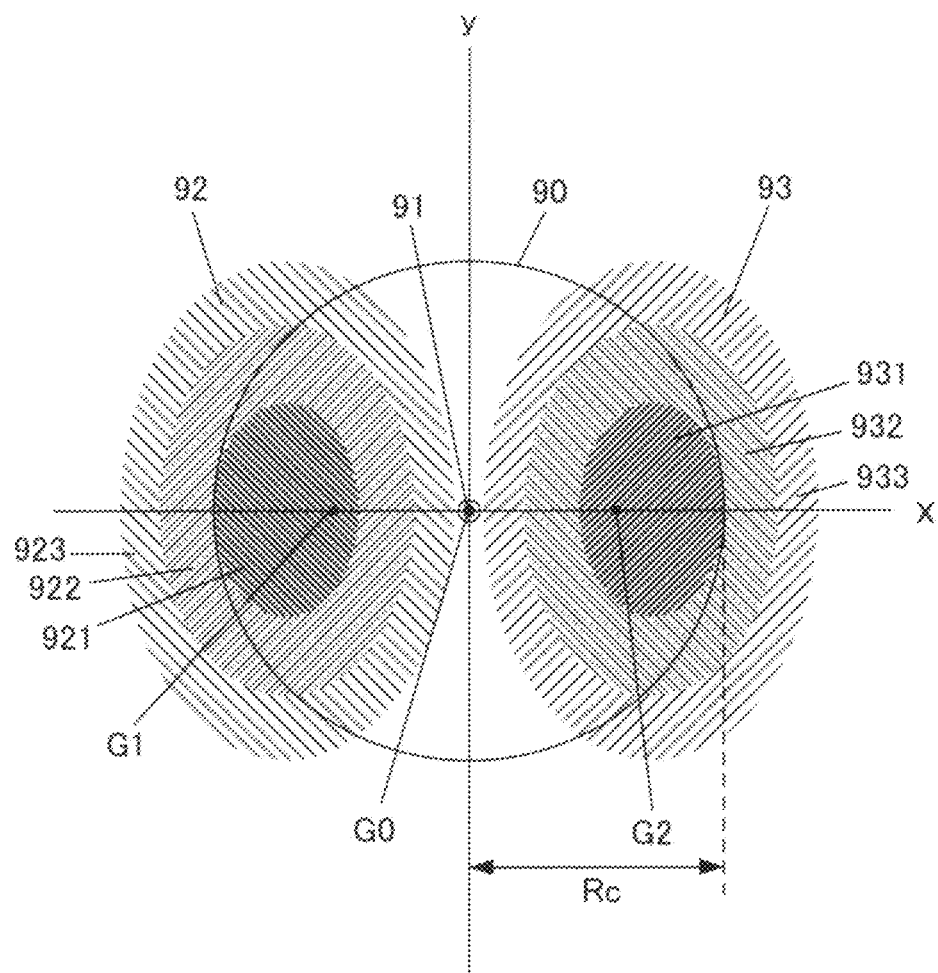
FIG. 3 illustrates a focus detection pupil (a range-finding pupil) distribution that may be manifested by the focus detection pupils (the range-finding pupils) used for purposes of focus detection.

As shown in FIG. 3, blurring attributable to the aberration and the diffraction at the micro-lenses is superimposed over the shapes of the projected images of the photoelectric conversion units in the distribution of the focus detection light at the focus detection pupils 92 and 93 (focus detection pupil distribution or range-finding pupil distribution). At the focus detection pupil 92, the blurring, the extent of which is the smallest on an innermost blur site 921, intensifies as the blur site moves to 922, and the extent of blurring is greatest over an outermost blur site 923. Likewise, at the focus detection pupil 93, blur, the extent of which is the least on an innermost blur site 931, intensifies as the blur site moves to a blur site 932, and the extent of blurring is greatest over an outermost blur site 933. It is to be noted that while FIG. 3 illustrates the blurring at the focus detection pupils 92 and 93 over three different levels for purposes of simplification, the extent of blurring changes continuously in reality.

In FIG. 3, part of the focus detection light fluxes is blocked by the exit pupil 90 of the photographic optical system. The focus detection light in the focus detection pupil distribution that can be actually utilized for focus detection is limited to that inside the exit pupil 90, and the positions of the gravitational centers within the inner area are pupil gravitational centers G1 and G2 in the focus detection pupil distribution that can be actually used for purposes of focus detection. The pupil gravitational center G1 is the gravitational center of an overlapping area where the focus detection pupil 92 and the exit pupil 90 overlap, whereas the pupil gravitational center G2 is the gravitational center of the overlapping area where the focus detection pupil 93 and the exit pupil 90 overlap. The pupil gravitational center distance g indicates the distance between the pupil gravitational centers G1 and G2. In FIG. 3, the direction along which the focus detection pupils 92 and 93 are set side-by-side extends along an x axis, and thus, the pupil gravitational centers G1 and G2 assuming positions on the x axis are the gravitational centers of the focus detection pupils 92 and 93 along the x axis. Assuming that the origin point of the x axis is taken at the center G0 of the entrance pupil, the positions $x_{G1}$ and $x_{G2}$ of the pupil gravitational centers G1 and G2 are expressed as in (2) below. In expression (2), G represents the pupil gravitational center G1 or G2, f(x, y) represents the focus detection pupil distribution at the focus detection pupils 92 and 93 and Q represents the inner area ranging within the exit pupil 90, which is part of the focus detection pupil distribution at the focus detection pupils 92 and 93.

$$x_G = \frac{\iint_Q x \cdot f(x, y) dx dy}{\iint_Q f(x, y) dx dy} \qquad (2)$$

Figure 4:
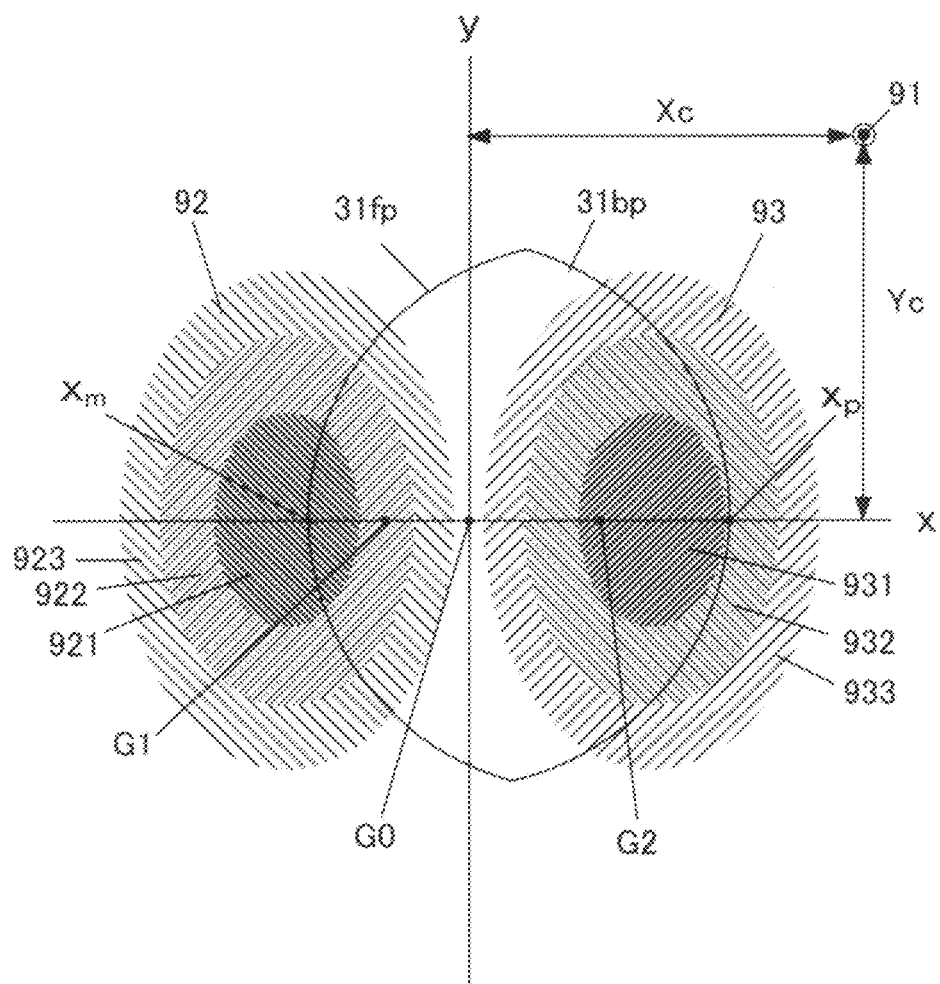
FIG. 4 illustrates a focus detection pupil (a range-finding pupil) distribution that may be manifested when light is restricted at an opening.

As long as the focus detection area assumes a position taken on the optical axis 91, the pair of image waveforms achieve symmetry, as shown in FIG. 3. However, if the focus detection area is not on the optical axis 91, the exit pupil position will be different from the entrance pupil position and light beams passing through the focus detection pupil distribution will be restricted by a structural element (an aperture opening, a lens opening or the like) of the interchangeable lens 202 (see FIG. 1). FIG. 4 illustrates an example of the case that the focus detection area is set apart from the optical axis 91 by a distance Xc along the x axis and by a distance Yc along the y axis. At the focus detection pupil 92, the blurring, the extent of which is the least on an innermost blur site 921, intensifies as the blur site moves to a blur site 922, and the extent of blurring is greatest over an outermost blur site 923. Likewise, at the focus detection pupil 93, the extent of which is the least on an innermost blur site 931, intensifies as the blur site moves to blur site 932, and the extent of blurring is greatest over an outermost blur site 933. It is to be noted that while FIG. 4 illustrates the blurring at the focus detection pupils 92 and 93 over three different levels for purposes of simplification, the extent of blurring actually changes continuously.

In reality, the light passing through the focus detection pupil distribution will be restricted by a structural element of the interchangeable lens 202, as explained above. For this reason, the pair of image waveforms formed with a pair of focus detection light fluxes thus restricted will be trapped within an inner area defined by a front-lens exit pupil 31*fp* and a rear-lens exit pupil 31*bp*, as shown in FIG. 4, and therefore will not be in balance. In other words, the pair of image waveforms will be offset relative to each other along the lateral direction and, furthermore, the amplitudes of the waveforms will no longer match. Accordingly, an image shift detection operation with which such unbalanced image waveforms can be handled will need to be devised. As detailed later, part of the focus detection light fluxes is blocked by the front-lens exit pupil 31*fp* and the rear-lens exit pupil 31*bp* at the aperture exit pupil plane.

The exit pupil of the photographic optical system thus assumes a shape, the left side of which is defined by the front-lens exit pupil 31*fp* and the right side of which is defined by the rear-lens exit pupil 31*bp*, as shown in FIG. 4. The focus detection pupil distribution that can be utilized in the actual focus detection is an area ranging within the exit pupil assuming such a shape, which is hereafter referred to as a peripheral exit pupil, and the gravitational centers of the inner area ranging within the peripheral exit pupil are the gravitational centers G1 and G2 in the focus detection pupil distribution that can be utilized in the actual focus detection. Namely, the pupil gravitational center G1 is the gravitational center of an overlapping area where the focus detection pupil 92 and the front-lens exit pupil 31*fp* overlap, whereas the pupil gravitational center G2 is the gravitational center of an overlapping area where the focus detection pupil 93 and the rear-lens exit pupil 31*bp* overlap. The gravitational centers are those assumed along the direction in which the focus detection pupils are set side-by-side (along the x direction in the figure).

Figure 5:
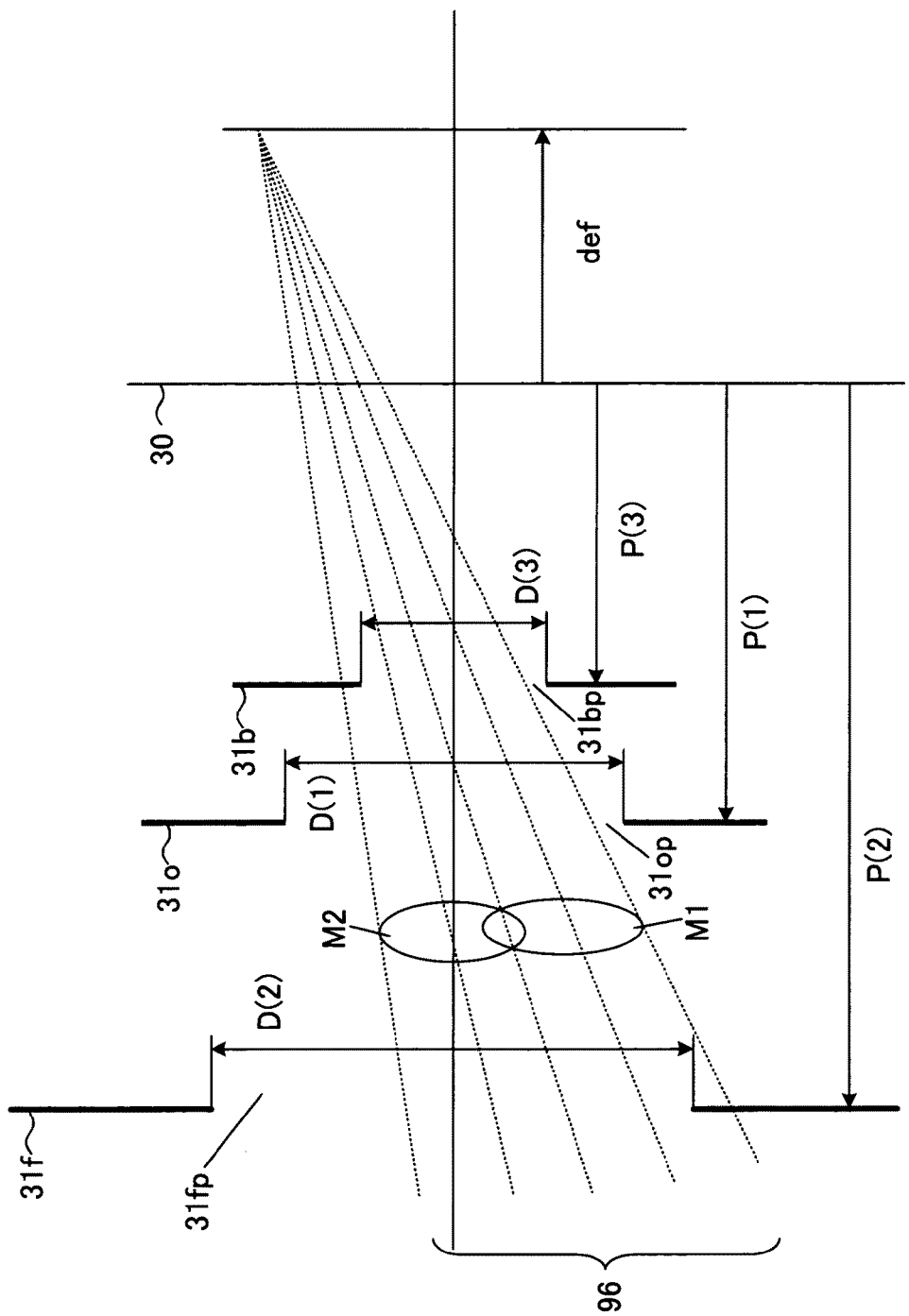
FIG. 5 illustrates a focus detection light flux vignetted by a plurality of openings.

FIG. 5 illustrates a focus detection light flux 96 clipped (vignetted) by a plurality of openings. In FIG. 5, a position P(2) represents the positional coordinates of a front-lens exit pupil plane 31*f*, which are determined by the distance between the front-lens exit pupil plane 31*f* and a predetermined focal plane 30, whereas an opening diameter D(2) represents the diameter of the front-lens exit pupil 31*fp* measured at the front-lens exit pupil plane 31*f*. A position P(3) represents the positional coordinates of a rear-lens exit pupil plane 31*b*, which are determined by the distance between the rear-lens exit pupil plane 31*b* and the predetermined focal plane 30, whereas an opening diameter P(3) represents the diameter of the rear-lens exit pupil 31*bp* measured at the rear-lens exit pupil plane 31*b*. def indicates the distance (defocus amount) between the predetermined focal plane 30 and the image forming plane. In addition, a position P(1) represents the positional coordinates of an aperture exit pupil plane 31*o*, which are determined by the distance from the predetermined focal plane 30, whereas an opening diameter D(1) represents the diameter of an aperture exit pupil 31*op* measured at the aperture exit pupil plane 31*o*.

FIG. 5 shows an opening (aperture exit pupil) formed with the aperture, an opening (front-lens exit pupil) formed with the front lens (the lens with a specific opening diameter that most contributes to restricting light fluxes traveling toward the periphery of the image plane, among lenses assuming positions to the front relative to the aperture) and an opening (rear-lens exit pupil) formed with the rear lens (lens with a specific opening diameter that most contributes to restricting light fluxes traveling toward the periphery of the image plane, among the lenses assuming positions to the rear relative to the aperture) with one of a pair of focus detection light fluxes 96 corresponding to the focus detection position, i.e., a focus detection light flux M1, being vignetted to the greatest extent by the front lens and the other focus detection light flux, i.e., a focus detection light flux M2 being vignetted to the greatest extent by the rear lens.

If the arithmetic operation, which is also affected by any focus detection area switch or replacement of the interchangeable lens 202, is executed as expressed in (2) based upon the vignetting condition for each photographing operation session, a certain length of time will have to be spent on the focus detection every time a photographing operation is executed. Accordingly, the pupil gravitational center distance g is determined as expressed in the polynomial (3) below. By determining the pupil gravitational center distance in this manner, the length of time required for focus detection will be reduced and the processing can be further expedited. It is to be noted that $x_m$ and $x_p$ in expression (3) respectively indicate the positions of the intersection point at which the external circumference of the front-lens exit pupil 31*fp* and the x axis intersect each other and the intersection point at which the external circumference of the rear-lens exit pupil 31*bp* and the x axis intersect each other (see FIG. 4) and that $x_m<0$ and $x_p>0$ since the pupil center G0 of the entrance pupil is the origin point of the x axis. Constants $a_1$, $a_2$, $b_1$, $b_2$ and c are constants inherent to the focus detection device achieved in this embodiment, and the values to be set for the constants should be determined through a statistical method such as the method of least squares by measuring in advance defocusing values at varying image heights in conjunction with various interchangeable lenses 202. The constants $a_1$, $a_2$, $b_1$, $b_2$ and c thus determined should be stored in the storage device 219 within the camera body 203. It is to be noted that instead of storing in the storage device 219 the values for the constants $a_1$, $a_2$, $b_1$, $b_2$ and c in correspondence to all types of interchangeable lenses that may be mounted at the camera body 203, a set of values for the constants $a_1$, $a_2$, $b_1$, $b_2$ and c for a specific type of interchangeable lens 202 may be stored into the storage device 207 of the particular interchangeable lens 202.

$$g=a_1 \cdot x_m^2 + b_1 \cdot x_m + a_2 \cdot x_p^2 + b_2 \cdot x_p + c \quad (3)$$

The values for $x_m$ and $x_p$ may be calculated through approximation based upon the opening data stored in the storage device 207. This point is now described in further detail. Assuming that the opening data stored in the storage device 207 indicate the radius R(i) and the position P(i) mentioned above of each of the three (i=1, 2, 3) circular openings at the aperture exit pupil plane 31*o*, the front-lens exit pupil plane 31*f* and the rear-lens exit pupil plane 31*b* in FIG. 5, the radius Rc(i) of the exit pupil 90 mentioned earlier can be expressed as in (4) below by using the focus detection pupil distance L mentioned above.

$$Rc(i) = R(i) \cdot \frac{L}{P(i)} \quad (4)$$

In FIG. 4, the focus detection area assumes a position set apart from the optical axis 91 by a distance Xc along a direction parallel to the x axis and by a distance Yc along a direction parallel to the y axis. Assuming an image height (ix, iy) on the predetermined image forming plane, distances Xc(i) and Yc(i) corresponding to each of the three circular openings mentioned above can be respectively calculated as expressed in (5) and (6) below in this case.

$$Xc(i) = \{P(i) - L\} \cdot \frac{|ix|}{P(i)} \quad (5)$$

$$Yc(i) = \{P(i) - L\} \cdot \frac{|iy|}{P(i)} \quad (6)$$

In the example presented in FIG. 4, the right side of the peripheral exit pupil forms a circular arc defined by the rear-lens exit pupil 31*bp* and the left side of the peripheral exit pupil forms a circular arc defined by the front-lens exit pupil 31*fp*, as described earlier. With Xp(i) representing a higher-value point at which the external circumference of the peripheral exit pupil and the x axis intersect each other and Xm(i) representing a lower-value point at which the external circumference of the peripheral exit pupil and the x axis intersect each other, the values for Xp(i) and Xm(i) corresponding to each of the three circular openings can be respectively calculated as expressed in (7) and (8) below.

$$Xp(i) = Xc(i) + \sqrt{Rc(i)^2 - Yc(i)^2} \quad (7)$$

$$Xm(i) = Xc(i) - \sqrt{Rc(i)^2 - Yc(i)^2} \quad (8)$$

Through the arithmetic operation executed as described above, $x_p = \min\{X_p(i)\}$ and $x_m = \max\{X_m(i)\}$ can be calculated for i=1, 2 and 3. Through the process described above, the pupil gravitational center distance g between the gravitational centers of the pair of images is calculated as expressed in (3) and then the defocus amount def is calculated as expressed in (1).

Figure 6:
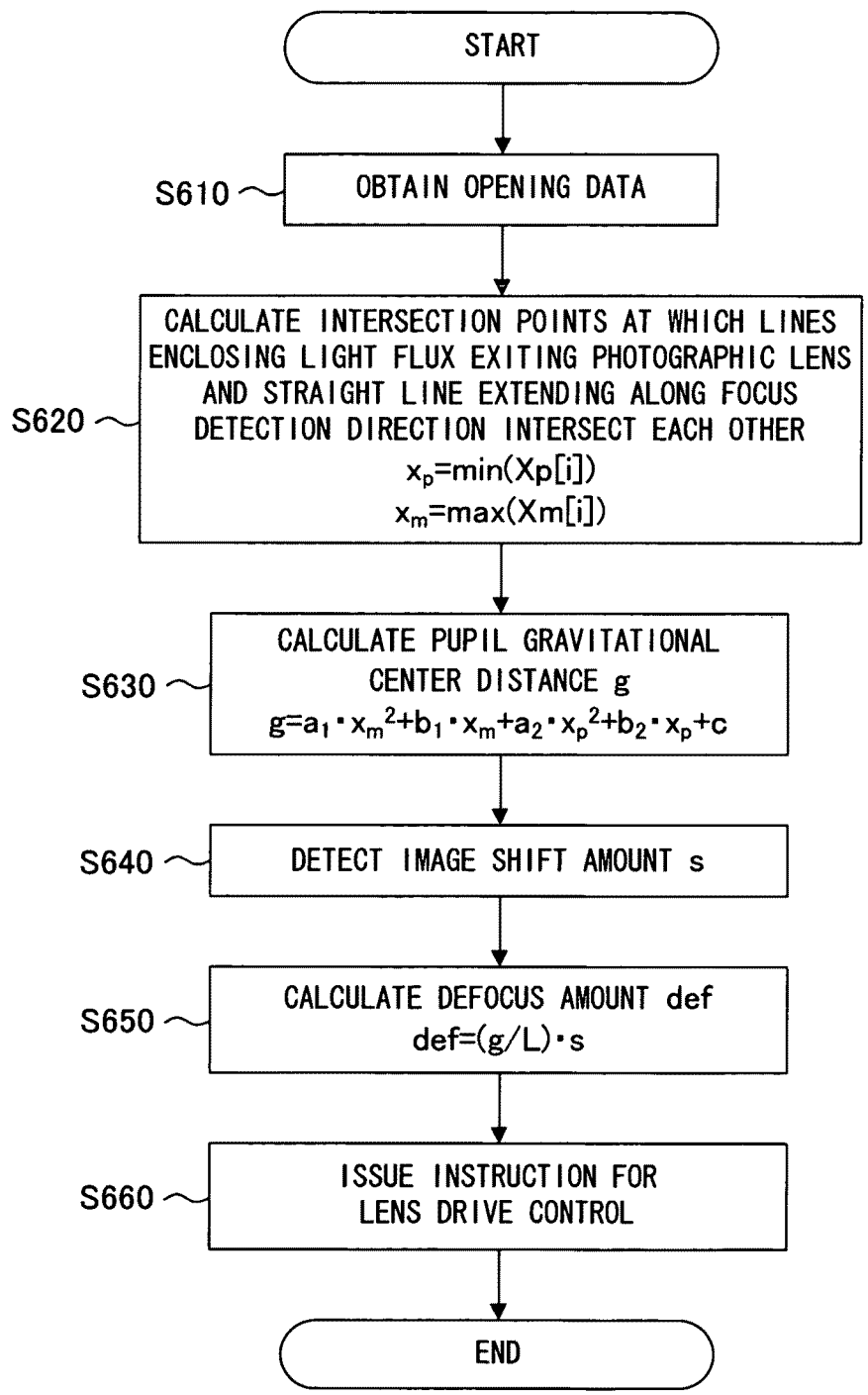
FIG. 6 presents a flowchart of the focus detection operation executed in the focus detection device in a first embodiment.

FIG. 6 presents a flowchart of the focus detection operation executed by the focus detection device in the embodiment. The processing in the flowchart is executed by the body CPU 214 in the focus detection device. In step S610, the body CPU 214 obtains the opening data stored in the storage device 207. In step S620, the positions of the intersection points $x_p$ and $x_m$ at which the lines defining the range within which the light fluxes exiting the photographic lens are contained and the straight line extending along the focus detection direction intersect each other are calculated through the arithmetic operation executed as explained earlier. In step S630, the pupil gravitational distance g is calculated as expressed in (3). In step S640, the image shift amount s is detected through the focus detection processing executed by adopting the split-pupil phase detection method. In step S650, the defocus amount def is calculated as expressed in (1). In step S660, an instruction is issued for the lens CPU 206 so as to execute lens drive control based upon the defocus amount def. The processing in the flowchart then ends.

The focus detection device achieved in the first embodiment described above is equipped with a focus detection optical system adopting the split-pupil phase detection method, which includes a focus detection pixel row where a pair of photoelectric conversion units 52 and 53 and an adjacent pair of photoelectric conversion units 62 and 63 are disposed and micro-lenses 50 and 60, which respectively guide a pair of focus detection light fluxes 72 and 73 and a pair of focus detection light fluxes 82 and 83, formed by pupil-splitting light transmitted through the interchangeable lens 202, to the focus detection pixel row, and detects the image shift amount based upon signals output from the focus detection pixel row. The body CPU 214 executes the processing in step S610 so as to obtain three sets of opening data related to the radii of three circular openings that restrict light transmitted through the interchangeable lens 202 and the distances from the predetermined focal plane 30 to the individual circular openings, the processing in step S630 so as to calculate the pupil gravitational center distance g between the pupil gravitational centers G1 and G2 of a pair of overlapping areas where the pair of focus detection pupils 92 and 93 defined by the micro-lenses 50 and 60 and the focus detection pixel row in the focus detection optical system overlap the exit pupil 90 of the interchangeable lens 202, and the processing in step S650 so as to convert the image shift amount to a defocus amount based upon the pupil gravitational center distance g having been calculated. Such a focus detection device achieves advantages of reducing the arithmetic operation volume and expediting the processing executed in the focus detection operation.

Second Embodiment

In the first embodiment, the pupil gravitational center distance g is calculated through approximation based upon the polynomial expression (3) and the defocus amount def is calculated as expressed in (1). As an alternative, the conversion coefficient K in expression (1) may be calculated through approximation by utilizing a neural network. Such a neural network operation may be executed by assuming, for instance, the neural network structure disclosed in Japanese Laid Open Patent Publication No. H6-214285, as in the second embodiment described below.

Figure 7:
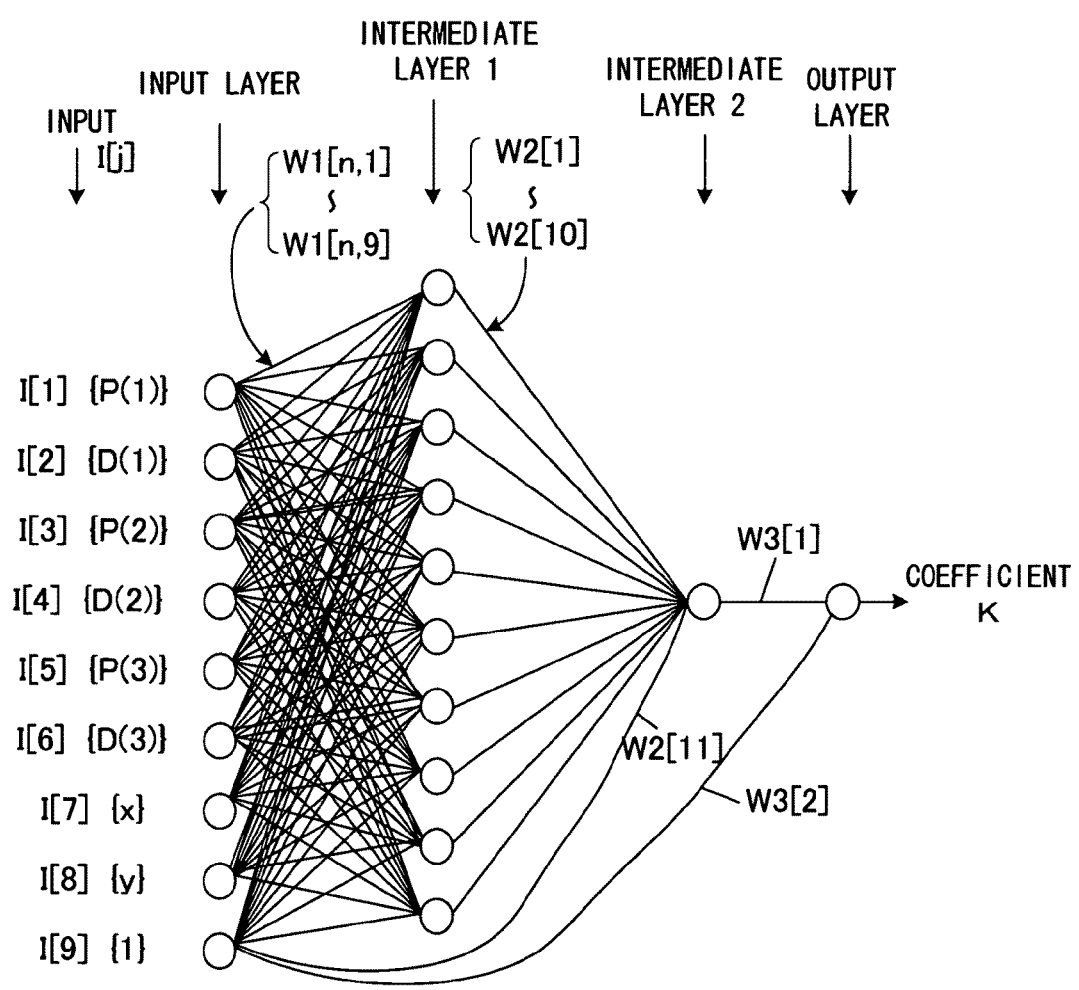
FIG. 7 is a diagram illustrating the neural network structure assumed by the focus detection device in a second embodiment.

FIG. 7 is a diagram showing the neural network structure assumed in the focus detection device in the embodiment. Through this neural network, the conversion coefficient K is output. The neural network is made up with an input layer that receives nine inputs, two intermediate layers and an output layer from which a correction value is output. The neural network is stored in the storage device 219.

The positions P(1), P(2) and P(3) and the diameters D(1), D(2) and D(3) of the front-lens exit pupil 31$fp$, the rear-lens exit pupil 31$bp$ and the aperture exit pupil 31$op$ forming the three openings in FIG. 5, the positional coordinates (x, y) of the focus detection area and a constant 1 are input to the neural network as I(1) through I(9). While the positional coordinates (x, y) of the focus detection area may assume values within ranges of, for instance, $-5 \le x \le 5$ and $-3 \le y \le 3$, the ranges are not limited to these examples. The results of weighted addition of the input values I(1) through I(9), achieved by applying associative weights Wn having been optimized through advance learning or the like, are then converted through a sigmoid function f(t) expressed in (9) below at the intermediate layer 1, and the conversion results are provided as input values for the subsequent neural layer. In addition, the results of weighted addition of the values output from the intermediate layer 1, achieved by applying associative weights Wn having been optimized through advance learning or the like, are converted through the sigmoid function f(t) expressed in (9) below at the intermediate layer 2, and the conversion results are provided as an input value for the subsequent neural layer.

$$f(t) = \frac{2}{1 + \exp(-t)} - 1 \qquad (9)$$

More specifically, at the intermediate layer 1, weighted addition is executed for the input values I(n) by applying weights W1(n, 1), W1(n, 2), ... and W1(n, 9) and the values obtained by converting the weighted addition results with the sigmoid function f(t) are provided as input values to be input to the corresponding output layer. In addition, at the intermediate layer 2, weighted addition is executed for the outputs from the intermediate layer 1 and I(9) by applying weights W2(1), W2(2), ... W2(11) and the value obtained by converting the weighted addition results with the sigmoid function f(t) is provided as an input value to be input to the output layer.

Then, at the output layer, the results of weighted addition executed for the output from the intermediate layer 2 and I(9) by applying W3(1) and W3(2) so as to adjust the range of the output (−1 through +1) from the intermediate layer 2 to the range of the actual correction value are directly output as the conversion coefficient K without applying the sigmoid function f(t). The defocus amount def is calculated as expressed in (1) in conjunction with the conversion coefficient K (=L/g) having been obtained as described above.

It is to be noted that the associative weights W used in this neural network operation are optimized in advance in a computer or the like by adopting a specific learning method of the known art such as the error back-propagation algorithm or the like and are stored in the storage device 219.

Figure 8:
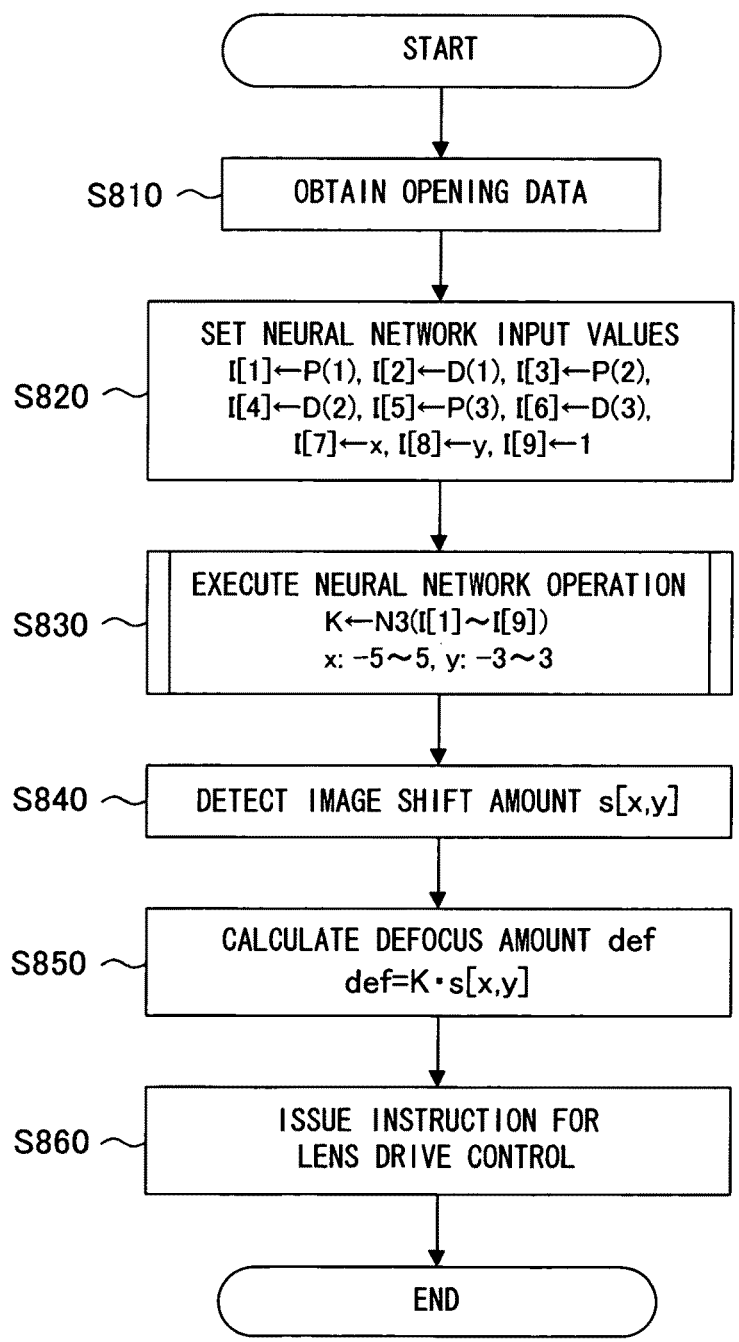
FIG. 8 presents a flowchart of the focus detection operation executed by the focus detection device in the second embodiment.

FIG. 8 presents a flowchart of the focus detection operation executed by the focus detection device in the embodiment. The processing in the flowchart is executed by the body CPU 214 in the focus detection device. In step S810, the body CPU 214 obtains the opening data stored in the storage device 207. In step S820, the input values I(1) to I(9) are set to the neural network shown in FIG. 7. In step S830, the conversion coefficient K is calculated through neural network operation. It is to be noted that the ranges of the values that may be taken for x and y indicating the positional coordinates of the focus detection area indicated earlier are examples and ranges other than these may be assumed. In step S840, the image shift amount s is detected through focus detection processing executed by adopting the split-pupil phase detection method. In step S850, the defocus amount def is calculated as expressed in (1). In step S860, an instruction is issued for the lens CPU 206 so as to control lens drive based upon the defocus amount def. The processing in the flowchart then ends.

Figure 9:
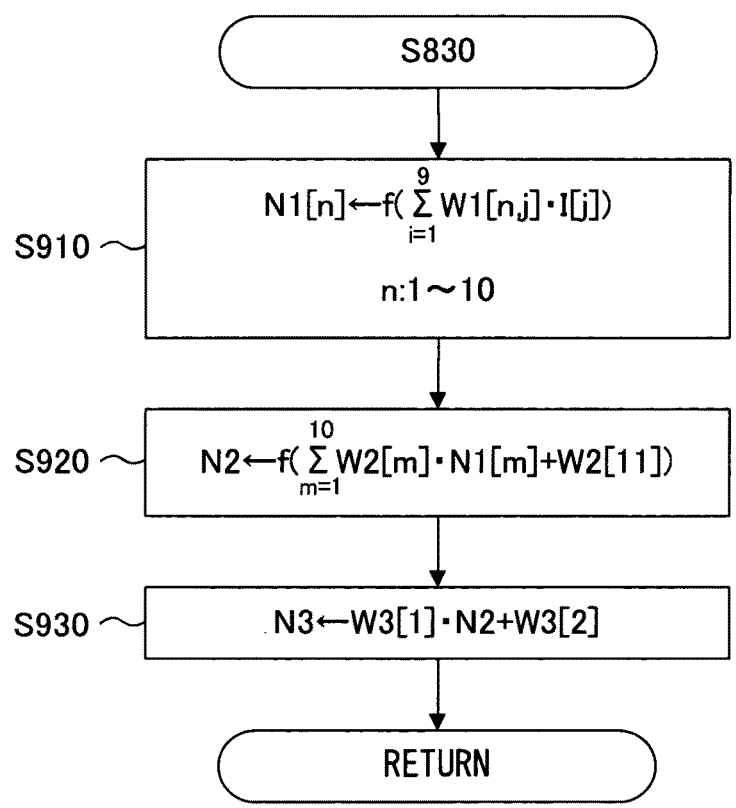
FIG. 9 presents a detailed flowchart of the calculation processing executed to calculate the conversion coefficient K through the neural network operation.

FIG. 9 presents a detailed flowchart of the calculation processing executed in step S830 in FIG. 8 to calculate the conversion coefficient K through the neural network operation. In step S910, the input values I(1) to I(9) respectively weighted with W1 (n, 1) to W1(n, 9) used as associative weights for the input layer and the intermediate layer 1 are integrated and output values N1(n) to be output from the intermediate layer 1 are then calculated by applying the sigmoid function f(t) expressed in (9) to the integration results.

In step S920, the output values N1(1) to N1(10) provided from the intermediate layer 1 weighted with W2(1) to W2(10) used as associative weights for the intermediate layer 1 and the intermediate layer 2 are integrated and an output value N2 to be output from the intermediate layer 2 is calculated by adding weight W2(11) to the integration results and then applying the sigmoid function f(t) expressed in (9) to the sum.

In step S930, an output value N3 to be output from the output layer is calculated by adding a weight W3(2) to the product of the output value N2 from the intermediate layer 2 and a weight W3(1) used as an associative weight for the intermediate layer 2 and the output layer. The output value N3 is returned as the conversion coefficient K, before ending the processing in the flowchart.

The focus detection device achieved in the second embodiment described above includes the storage device 219 in which a neural network, taking input values constituted with the three sets of opening data obtained via the body CPU 214 and the data indicating the positional coordinates (x, y) of the focus detection area, is stored.

The body CPU 214 executes the processing in step S850 so as to convert the image shift amount to a defocus amount based upon the value indicating the ratio of the pupil gravitational center distance g and the focus detection pupil distance L to the pair of focus detection pupils 92 and 93 from the micro-lenses 50 and 60. Through these measures, there are advantageous effects that the volume of the arithmetic operation to be executed can be reduced and the length of time required for the processing executed during the focus detection operation can also be reduced.

Third Embodiment

In the first embodiment, the pupil gravitational center distance g is calculated through approximation based upon the polynomial expression (3) and the defocus amount def is calculated as expressed in (1). As an alternative, the conversion coefficient K may be determined as expressed in (10) as described below in reference to the third embodiment.

Since the origin point of the x axis is set at the pupil center G0 of the entrance pupil, $x_m<0$ and $x_p>0$ in FIG. 4. The distance d between the two points $x_m$ and $x_p$ is calculated as; $d=x_p-x_m$, and L/d is substantially equivalent to an aperture value that will be assumed when the vignetting condition is taken into consideration. Constants a and b take values inherent to the focus detection device achieved in the embodiment, which are determined in correspondence to the F number of the photographic optical system. The conversion coefficient K needs to be calculated with even higher accuracy in conjunction with a photographic optical system with a smaller F number, i.e., in conjunction with a faster photographic optical system, so as to ensure that defocusing remains as inconspicuous as possible. Accordingly, the conversion coefficient K is calculated through an arithmetic operation executed in correspondence to the F value set at the photographic optical system as expressed in one of expressions (11) through (13), in which the conversion coefficient K is calculated by using constants $a_1, a_2, b_0, b_1$ and $b_2$ instead of through an arithmetic operation expressed in (10). It is assumed that the constants $a_1, a_2, b_0, b_1$ and $b_2$, are determined through a statistical method such as the method of least squares or the like by actually measuring in advance defocus amounts indicating extents of defocusing manifesting at varying image heights in conjunction with different interchangeable lenses 202. The constants $a_1, a_2, b_0, b_1$ and $b_2$ thus determined are stored together with constants $F_1$ and $F_2$ in the storage device 219. It is to be noted that instead of storing in the storage device 219 the values for the constants $a_1, a_2, b_0, b_1$ and $b_2$ and the constants $F_1$ and $F_2$ in correspondence to all types of interchangeable lenses that may be mounted at the camera body 203, a set of values for the constants $a_1, a_2, b_1, b_2$ and c and the constants $F_1$ and $F_2$ for a specific type of interchangeable lens 202 may be stored into the storage device 207 of the particular interchangeable lens 202.

$$K = a \cdot \left(\frac{L}{d}\right)^2 + b \tag{10}$$

$$K = b_0 \qquad (F \leq F_1) \tag{11}$$

$$K = a_1 \cdot \left(\frac{L}{d}\right)^2 + b_1 \quad (F_1 < F \leq F_2) \tag{12}$$

$$K = a_2 \cdot \left(\frac{L}{d}\right)^2 + b_2 \quad (F_2 < F) \tag{13}$$

Figure 10A:
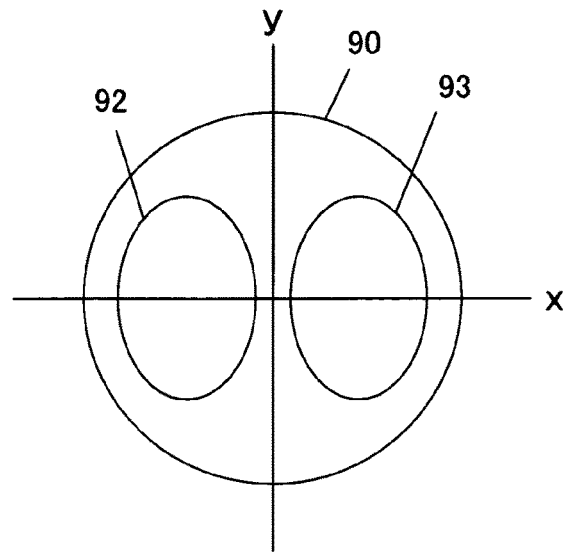
FIGS. 10A, 10B and 10C each illustrate a relationship that may be observed between the range of the focus detection pupil (the range-finding pupil) distribution and the range of the exit pupil.
Figure 10B:
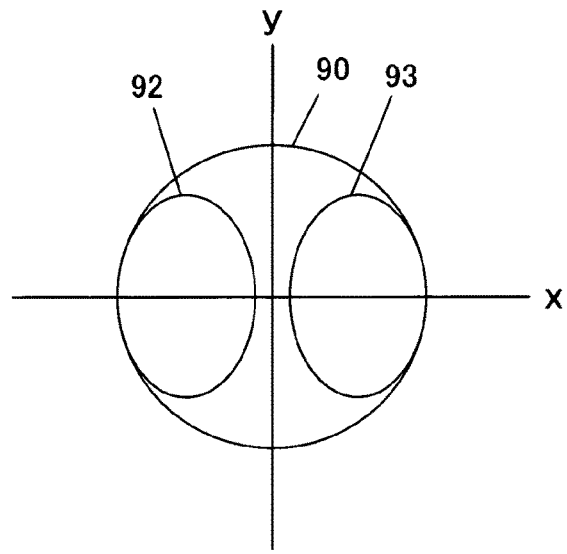

The conversion coefficient K is calculated as expressed in (11) if the F number at the photographic optical system is less than or equal to the constant $F_1$, as expressed in (12) if the F number at the photographic optical system is greater than the constant $F_1$ and is equal to or less than the constant $F_2$ and as expressed in (13) if the F number at the photographic of system is greater than the constant $F_2$. In expression (11), the conversion coefficient K is equal to the constant $b_0$ regardless of the value of L/d, since the focus detection pupils 92 and 93 are entirely included in the exit pupil 90, as shown in FIG. 10A. When the F number at the photographic optical system becomes greater and assumes a value equal to the constant $F_1$, the focus detection pupils 92 and 93 just fit within the exit pupil 90, as shown in FIG. 10B.

Figure 10C:
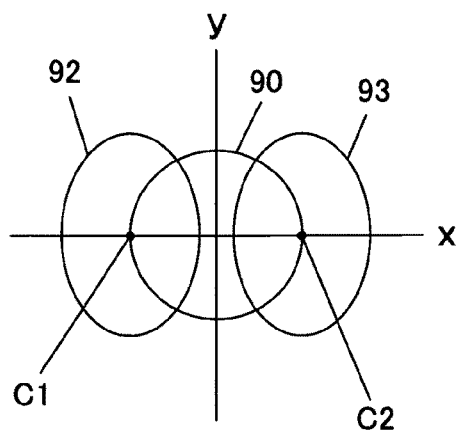

When the F number at the photographic optical system is greater than the constant $F_1$, the conversion coefficient K is calculated as expressed in (12) rather than (11), since the focus detection pupil distribution that can be actually utilized for focus detection is limited to the area inside the exit pupil 90, as explained earlier. At this time, as long as the F number at the photographic optical system is less than the constant $F_2$, the conversion coefficient K is calculated as a constant value as expressed in (12) so as to simplify the calculation processing. In addition, if the F number at the photographic optical system is equal to the constant $F_2$, the gravitational centers C1 and C2 of the two focus detection pupils 92 and 93 are both set on the external circumference of the exit pupil 90, as shown in FIG. 10C.

When the F number at the photographic optical system is greater than the constant $F_2$, the conversion coefficient K is calculated as expressed in (13) rather than (11) or (12). The constants $F_1$ and $F_2$ assume specific values in correspondence to the particulars of the focus detection optical system shown in FIG. 2, which are determined based upon, for instance, the diameter of the micro-lenses 50 and 60, the positions of the gravitational centers of the photoelectric conversion units 52, 53, 62 and 63 relative to the optical axis 91 and the distance from the micro-lenses 50 and 60 to the photoelectric conversion units 52, 53 and 62, 63.

As has been explained in reference to the first embodiment, $x_m$ and $x_p$ can be calculated through approximation based upon the opening data stored in the storage device 207. They can be calculated as; $x_p=\min\{Xp(i)\}$ and $x_m=\max\{Xm(i)\}$ in correspondence to i=1, 2 and 3 through the arithmetic operation executed as expressed in (4) through (8). Based upon $x_p$ and $x_m$ thus calculated, the distance d can be calculated. The conversion coefficient K can then be calculated based upon the distance d as expressed in (10) and finally, the defocus amount def can be calculated as expressed in (1).

Figure 11:
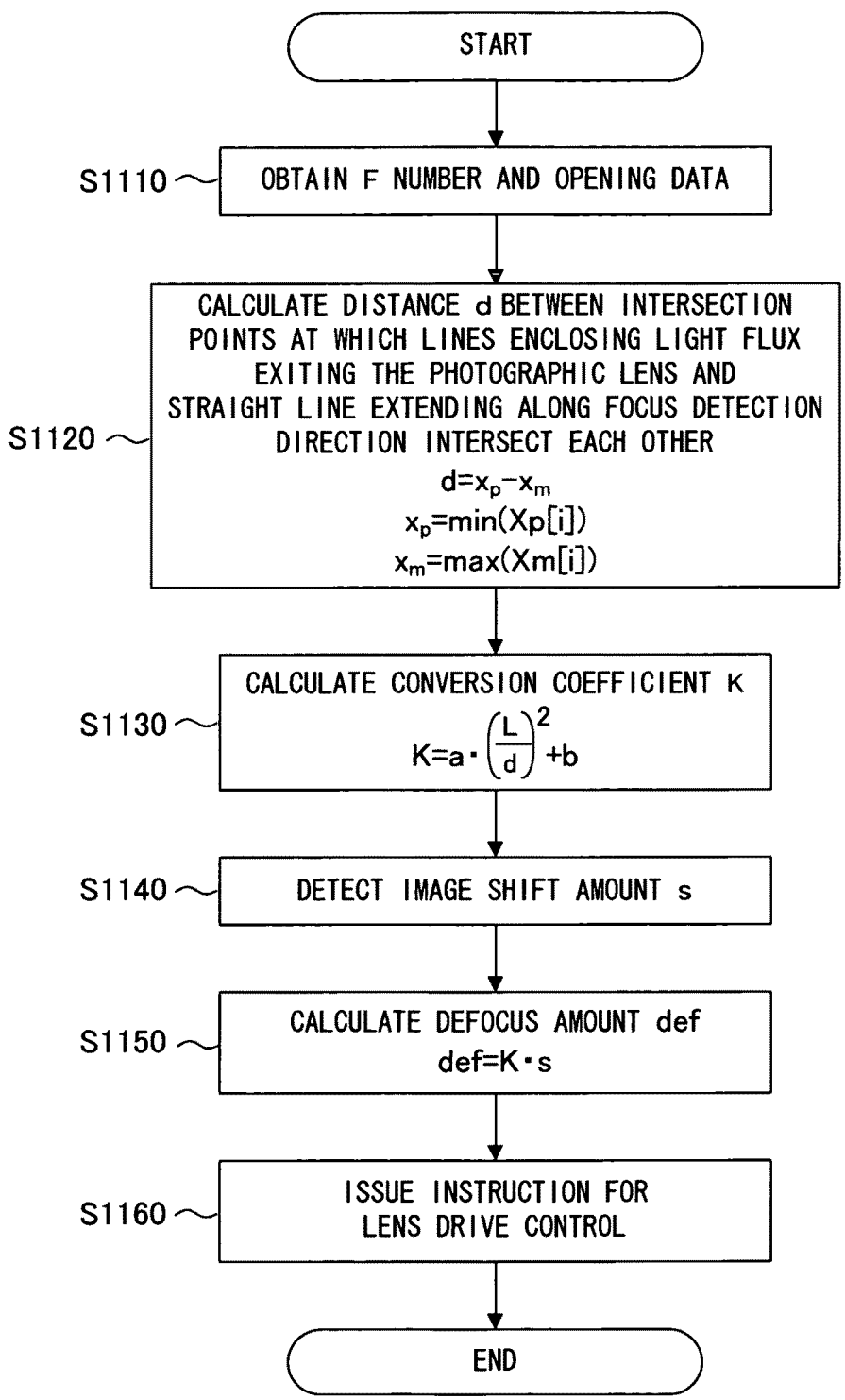
FIG. 11 presents a flowchart of the focus detection operation executed by the focus detection device in a third embodiment.

FIG. 11 presents a flowchart of the focus detection operation executed by the focus detection device in the embodiment. The processing in the flowchart is executed by the body CPU 214 in the focus detection device. In step S1110, the body CPU 214 obtains the F number from the lens CPU 206 and also obtains the opening data stored in the storage device 207. In step S1120 the body CPU 214 calculates the positions of the intersection points $x_p$ and $x_m$ at which the lines defining the range within which the light fluxes exiting the photographic lens are contained and the straight line extending along the focus detection direction intersect each other through the arithmetic operation executed as explained earlier and then calculates the distance d between the two points $x_m$ and $x_p$ by calculating their difference. In step S1130, the conversion coefficient K to be used when converting the image shift amount to a defocus amount is calculated as expressed in (10). In more specific terms, the conversion coefficient K is calculated by using one of expressions (11) through (13) in correspondence to the F number, as explained earlier. In step S1140, the image shift amount s is detected through the focus detection processing executed by adopting the split-pupil phase detection method. In step S1150, the defocus amount def is calculated as expressed in (1). In step S1160, an instruction is issued for the lens CPU 206 so as to execute lens drive control based upon the defocus amount def. The processing in the flowchart then ends.

The body CPU 214 of the focus detection device achieved in the third embodiment as described above executes the processing in step S1120 so as to calculate, based upon the three sets of opening data having been obtained in step S1110, the distance d between the intersection point $x_m$, at which a straight line passing through the pupil gravitational centers G1 and G2 of a pair of overlapping areas and the outer circumference of the front-lens exit pupil 31fp of the interchangeable lens 202 intersect each other, and the intersection point $x_p$, at which the straight line passing through the pupil gravitational centers G1 and G2 and the outer circumference of the rear-lens exit pupil 31 by intersect each other. It also executes the processing in step S1150 so as to convert the image shift amount to a defocus amount based upon the value assumed for the ratio of the focus detection pupil distance L to the pair of focus detection pupils 92 and 93 from the microlenses 50 and 60 and the pupil gravitational center distance g. Through these measures, there are advantageous effects that the volume of the arithmetic operation to be executed can be reduced and the length of time required for the processing executed during the focus detection operation can also be reduced.

Fourth Embodiment

In the third embodiment, the conversion coefficient K is calculated through approximation as expressed in (10) and then the defocus amount def is calculated as expressed in (1). Image-capturing pixels 1210 disposed at an image sensor 212 shown in FIG. 12 each include, for instance, a red (R) color filter, a green (G) color filter or a blue (B) color filter. Red image-capturing pixels 1210R equipped with red color filters R, green image-capturing pixels 1210G equipped with green color filters G and blue image-capturing pixels 1210B equipped with blue color filters B are disposed in a Bayer array. As shown in FIG. 13, three types of single-color light, i.e., red-color light received at the red image-capturing pixels 1210R, green-color light received at the green image-capturing pixels 1210G and blue-color light received at the blue image-capturing pixels 1210B, have wavelength bands different from one another. In other words, the red image-capturing pixels 1210R, the green image-capturing pixels 1210G and the blue image-capturing pixels 1210B have spectral sensitivity characteristics different from one another. As FIG. 13 indicates, the wavelength band corresponding to a range around the spectral sensitivity peak value for the green image-capturing pixels 1210G is the centered wavelength band between the wavelength band corresponding to a range around the spectral sensitivity peak value for the red image-capturing pixels 1210R and the wavelength band corresponding to a range around the spectral sensitivity peak value for the blue image-capturing pixels 1210B.

In addition, the red-color light, the green-color light and the blue-color light, each of which is single-color light with the wavelength band thereof different from those of the other two types of single-color light, assume diffraction characteristics different from one another. The focus detection pupil distribution shown in FIG. 3 is altered due to the effect of the diffraction, in correspondence to the mixing ratio at which the three types of single-color light in the incident light traveling from the subject are mixed. Blurs 921, 922, 923, 931, 932 and 933 occurring at the focus detection pupils 92 and 93 corresponding to each type of single-color light of the three types of single-color light are different from blurs occurring at the focus detection pupils corresponding to either of the other two types of single-color light. This means that values calculated for the pupil gravitational center distance g in correspondence to the various types of single-color light with varying wavelengths will also be different from one another and, accordingly, the values calculated for the conversion coefficient K will be different from one another. Namely, expression (10) will be defined in correspondence to each of the various types of single-color light assuming different wavelengths and expressions (11) through (13) will also be defined in correspondence to each single-color light.

However, expression (10), i.e., expressions (11) through (13), is used exclusively for the calculation of a conversion coefficient $K_G$ corresponding to the green-color light but is not used for the calculation of a conversion coefficient $K_R$ corresponding to the red-color light and a conversion coefficient $K_B$ corresponding to the blue-color light in the image-capturing apparatus achieved in the fourth embodiment. For this reason, the constants $F_1$ and $F_2$ and the constants $a_1$, $a_2$, $b_0$, $b_1$ and $b_2$ in expressions (11) through (13) need to be stored in the storage device 219 only in correspondence to the green-color light. The distance d is determined in relation to the incident light in which the various types of single-color light are mixed. In the image-capturing apparatus achieved in the fourth embodiment, a conversion coefficient K for the incident light in which the various types of single-color light are mixed is calculated based upon, for example, the conversion coefficient $K_G$ corresponding to the green-color light, as expressed in correction operation expression (14) to be detailed later, in which the mixing ratio of the green-color light, the red-color light and the blue-color light is factored in.

Figure 12:
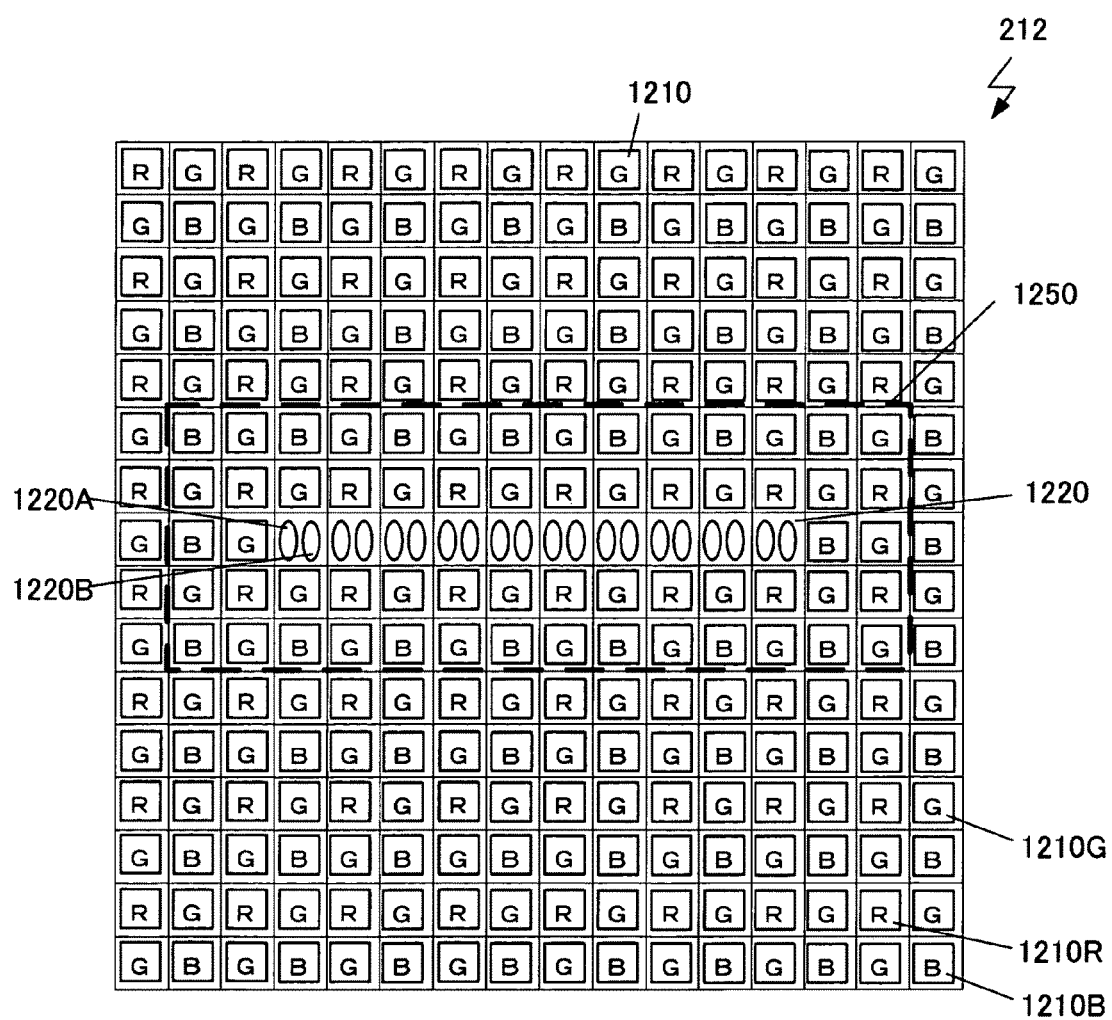
FIG. 12 is a front view of part of the pixel array on the image sensor, including a focus detection area.
Figure 13:
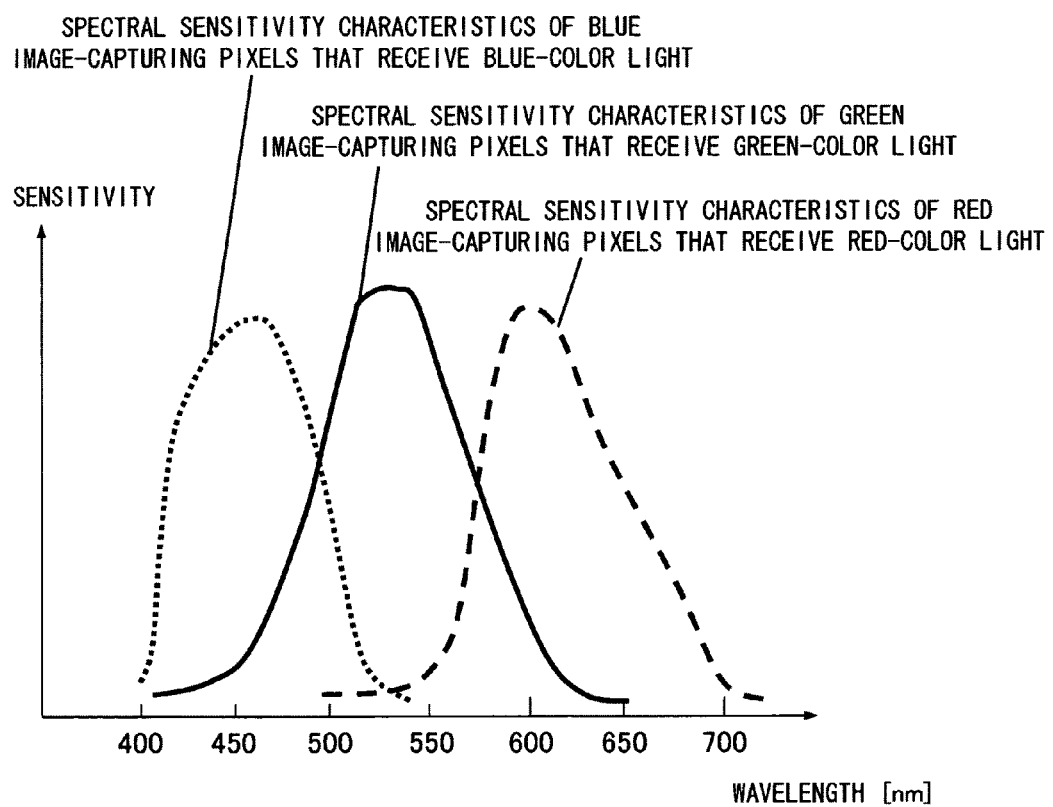
FIG. 13 shows the spectral sensitivity characteristics of various image-capturing pixels, each of which receives single-color light.

Focus detection pixels 1220 in FIG. 12 each include a pair of photoelectric conversion units 1220A and 1220B. These focus detection pixels 1220, disposed in single line so as to occupy part of a row in which green image-capturing pixels 1210G and blue image-capturing pixels 1210B, among the image-capturing pixels 1210 set in the Bayer array are disposed, form a focus detection area. The area enclosed by the dotted line in FIG. 12 is an example of an area 1250 that contains the focus detection area. The conversion coefficient K for the incident light, in which the various types of single-color light are mixed, is calculated by correcting the conversion coefficient $K_G$ corresponding to the green-color light as expressed in (14) based upon a mean output value $M_R$ of the values output from the red image-capturing pixels 1210R in the area 1250, a mean output value $M_G$ of the values output from the green image-capturing pixels 1210G in the area

1250 and a mean output value $M_B$ of the values from the blue image-capturing pixels 1210B in the area 1250.

$$K = K_G \cdot \left\{1 + \alpha(F) \cdot \frac{M_R - M_B}{M_R + M_G + M_B}\right\} \quad (0 < \alpha(F) < 1) \quad (14)$$

As described in Japanese Laid Open Patent Publication No. 2007-121896, the conversion coefficient K assumes different values in correspondence to the F number at the photographic optical system and thus, the conversion coefficient $K_G$, $K_R$ and $K_B$, too, change in correspondence to the F number at the photographic optical system. This means that a correction coefficient $\alpha(F)$ in expression (14) is a function of the F number at the photographic optical system. The wavelength band of the green-color light assumes a position at the center between the wavelength bands of the blue-color light and the red-color light, as indicated in FIG. 13. Namely, the wavelength band of the green-color light matches the central wavelength band in the wavelength distribution of the white incident light, in which the green-color light, the blue-color light and the red-color light are all evenly mixed and thus, the mean output values $M_R$ and $M_B$ corresponding to the red-color light and the blue-color light, the wavelength bands of which assume positions on opposite sides from each other across the wavelength band of the green-color light are both equal to the mean output value $M_G$ corresponding to the green-color light, i.e., the conversion coefficient K is equal to the conversion coefficient $K_G$. In the case of white incident light, this means that $M_R \approx M_G \approx M_B$, therefore $K \approx K_G$ in expression (14).

The diffraction angle of incident light with a greater red-color light content is larger than that of green-color light, and such incident light assumes a broader focus detection pupil distribution. The pupil gravitational center distance g calculated for this incident light will assume a greater value and as a result, the conversion coefficient K will be greater than the conversion coefficient $K_G$. In other words, when incident light is almost entirely constituted with red-color light, $M_B \approx M_G \approx 0$, therefore, $K \approx K_G \cdot \{1 + \alpha(F)\}$ in expression (14) leading to the conclusion that $K > K_G$. The diffraction angle of incident light with a greater blue-color light content is smaller than that of green-color light, and such incident light assumes a smaller focus detection pupil distribution. The pupil gravitational center distance g calculated for this incident light will assume a smaller value and as a result, the conversion coefficient K will be smaller than the conversion coefficient $K_G$. In other words, when incident light is almost entirely constituted with blue-color light, $M_R \approx M_G \approx 0$, therefore, $K \approx K_G \cdot \{1 - \alpha(F)\}$ in expression (14) leading to the conclusion that $K < K_G$. Therefore, the conversion coefficient K is calculated by taking into consideration the mixing ratio in which various types of single-color light are mixed in the incident light.

When a greater value is assumed for the F number at the photographic optical system, the size of the exit pupil 90 is reduced, as indicated in FIGS. 10A, 10B and 10C. As the size of the exit pupil 90 is reduced, the pupil gravitational center distance g becomes smaller, as shown in FIG. 3. Accordingly, the correction coefficient $\alpha(F)$ in expression (14) is determined as expressed in (15) in the embodiment. Constants p and q are constants inherent to the focus detection device achieved in this embodiment, and the values set for the constants should be determined through a statistical method such as the method of least squares by measuring in advance defocusing values at varying image heights in conjunction with various interchangeable lenses 202. The constants p and q thus determined are stored in the storage device 219.

$$\alpha(F) = p \cdot F^2 + q \quad (15)$$

Figure 14:
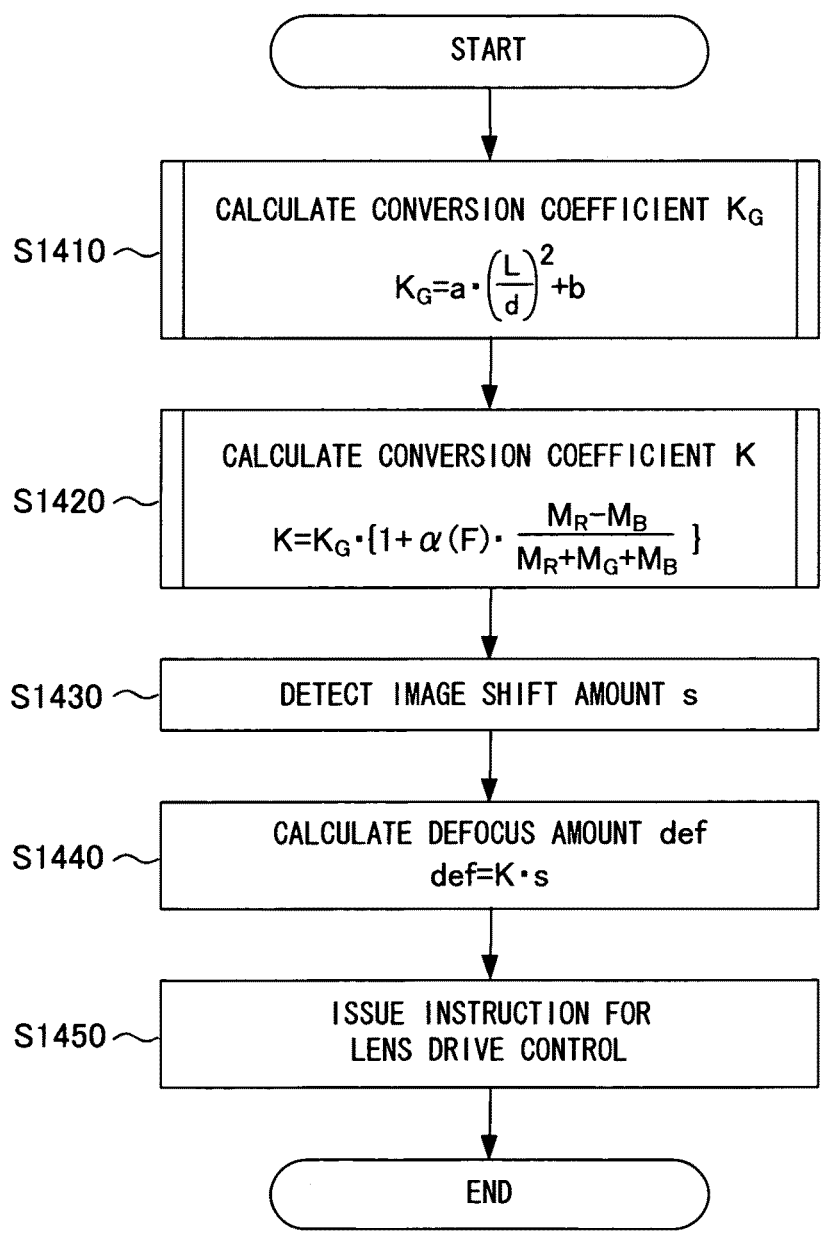
FIG. 14 presents a flowchart of the focus detection operation executed by the focus detection device in a fourth embodiment.

FIG. 14 presents a flowchart of the focus detection operation executed by the image-capturing apparatus in the embodiment. The processing in the flowchart is executed by the body CPU 214 in the focus detection device. In step S1410, the body CPU 214 calculates the conversion coefficient $K_G$ through the arithmetic operation of the third embodiment, executed as expressed in (10). In step S1420, the conversion coefficient K is calculated as expressed in (14). In step S1430, the image shift amount s is detected through the focus detection processing executed by adopting the split-pupil phase detection method. In step S1440, the defocus amount def is calculated as expressed in (1). In step S1450, an instruction is issued for the lens CPU 206 so as to execute lens drive control based upon the defocus amount def. The processing in the flowchart then ends.

The image-capturing apparatus achieved in the fourth embodiment as described above comprises the focus detection device achieved in the third embodiment and the image sensor 212 having a plurality of image-capturing pixels 1210, with three different sets of spectral sensitivity characteristics corresponding to a red-color light wavelength band, a green-color light wavelength band and a blue-color light wavelength band and output image signals corresponding to the three sets of spectral sensitivity characteristics different from one another by receiving light transmitted through the interchangeable lens 202, and having a focus detection area. The body CPU 214 executes the processing in step S1310 so as to calculate the conversion coefficient $K_G$ corresponding to the green-color light assuming the central wavelength band among the wavelength band corresponding to the red-color light, the wavelength band corresponding to the green-color light and the wavelength band corresponding to the blue-color light and the processing in step S1320 so as to correct the conversion coefficient $K_G$ based upon the mean output values $M_R$, $M_G$ and $M_B$ corresponding to the three different sets of spectral sensitivity characteristics, calculated by using the values output from the plurality of image-capturing pixels 1210 present in the area 1250 surrounding the focus detection area set on the image sensor 212. Through these measures, there are advantageous effects that the volume of the arithmetic operation to be executed can be reduced and the length of time required for the processing executed during the focus detection operation can also be reduced.

In the fourth embodiment, the conversion coefficient K is calculated as expressed in (15) based upon the conversion coefficient $K_G$ calculation expressed in (10), as has been described in reference to the third embodiment. However, the conversion coefficient K may be determined by using, for instance, a conversion coefficient $K_G$ calculated based upon the focus detection pupil distance $L_G$ corresponding to the green-color light and the pupil gravitational center distance $g_G$ corresponding to the green-color light and calculated as expressed in (3), as has been explained in reference to the first embodiment, instead. As an alternative, the conversion coefficient K may be determined based upon a conversion coefficient $K_G$ calculated in correspondence to the green-color light by assuming a neural network structure, as in the second embodiment.

While the first through third embodiments described above are achieved by adopting the present invention in conjunction with a focus detection optical system that detects the focusing condition via micro-lenses through the split-pupil phase detection method, the present invention may instead be adopted in conjunction with a focus detection optical system that detects the focusing condition through the split-pupil phase detection method by reforming images.

Such a focus detection system that detects the focusing condition through the split-pupil phase detection method by reforming images will include a condenser lens disposed near the predetermined image forming plane of the interchangeable lens with an image sensor disposed to the rear of the condenser lens. A pair of image reforming lenses via which the secondary images of a primary image formed near the predetermined image forming plane are formed on the image sensor, will be disposed between the condenser lens and the image sensor, with an aperture mask having a pair of aperture openings formed therein disposed near the pair of image reforming lenses.

The image sensor will be a line sensor equipped with a plurality of photoelectric conversion units densely arrayed in a linear pattern. The direction along which the photoelectric conversion units are set side-by-side will match the direction along which the pair of focus detection pupils are set side-by-side (i.e., the direction along which the aperture openings are set side-by-side). From this image sensor, information corresponding to the intensity distribution of the pair of images reformed on the image sensor will be output. An image shift amount indicating the extent of shift manifested by the pair of images will be detected through image shift detection arithmetic processing (correlation processing, phase difference detection processing) executed on the information. Then, by multiplying the image shift amount by a specific conversion coefficient, the deviation of the current image forming plane relative to the predetermined image forming plane (defocus amount) will be calculated.

Images of the plurality of photoelectric conversion units disposed at the image sensor will be projected onto the predetermined image forming plane via the image reforming lenses. The accuracy with which the defocus amount (image shift amount) is detected will be determined by the image shift amount detection pitch (i.e., the pitch at which the plurality of photoelectric conversion units with the images thereof projected onto the predetermined image forming plane are arrayed).

The aperture openings in the aperture mask will be projected as a pair of focus detection pupils onto the exit pupil via the condenser lens. In other words, the pair of images reformed on the image sensor will be formed with the focus detection light fluxes passing through the pair of focus detection pupils on the exit pupil.

As long as the functions characterizing the present invention are not compromised, the present invention is in no way limited to the specific structural features described in reference to the embodiments.

The above described embodiments are examples, and various modifications can be made without departing from the scope of the invention.

What is claimed is:

1. A focus detection device, comprising:
    a focus detection unit that includes a pair of light-receiving element arrays and lens systems via which a pair of focus detection light fluxes obtained by pupil-splitting transmitted light transmitted through a photographic optical system are each guided to one of the pair of light-receiving element arrays, and detects an image shift amount based upon output signals output from the pair of light-receiving element arrays by adopting a split-pupil phase method;
    an acquisition unit that obtains a plurality of sets of opening data pertaining to sizes and positions of a plurality of openings that restrict the transmitted light at the photographic optical system;
    a function value calculation unit that calculates, based upon the plurality of sets of opening data, a function value pertaining to a gravitational center distance between gravitational centers of a pair of overlapping areas where a pair of specific focus detection pupils determined in correspondence to the lens systems and the pair of light-receiving element arrays at the focus detection unit overlap an exit pupil of the photographic optical system; and
    a conversion unit that converts the image shift amount to a defocus amount based upon the function value calculated by the function value calculation unit.

2. A focus detection device according to claim 1, wherein:
    the function value represents the gravitational center distance;
    the function value calculation unit calculates the gravitational center distance by substituting, in a quadratic expression pertaining to variables representing positions of two intersection points at which a straight line passing through the gravitational centers of the pair of overlapping areas intersect an outer edge of the exit pupil of the photographic optical system, variable values, determined based upon the plurality of sets of opening data obtained by the acquisition unit and position data indicating a position at which focus detection is executed on the light-receiving element arrays, for the variables; and
    the conversion unit converts the image shift amount to the defocus amount based upon a focus detection pupil distance to the pair of focus detection pupils from the lens systems and the gravitational center distance calculated by the function value calculation unit.

3. A focus detection device according to claim 1, further comprising:
    a storage unit where a neural network that uses as input values thereof the plurality of sets of opening data obtained via the acquisition unit and position data indicating a position at which focus detection is executed on the pair of light-receiving element arrays is stored, wherein:
    the function value is a value indicating a ratio of a focus detection pupil distance to the pair of focus detection pupils from the lens systems and the gravitational center distance; and
    the conversion unit converts the image shift amount to the defocus amount based upon the value indicating the ratio.

4. A focus detection device according to claim 1, further comprising:
    a distance calculation unit that calculates, based upon the plurality of sets of opening data obtained via the acquisition unit, an intersection point distance between two intersection points at which a straight line passing through the gravitational centers of the pair of overlapping areas intersect an outer edge of the exit pupil of the photographic optical system, wherein:
    the function value is a value indicating a ratio of a focus detection pupil distance to the pair of focus detection pupils from the lens systems and the gravitational center distance;
    the function value calculation unit calculates the value indicating the ratio based upon the focus detection pupil distance and the intersection point distance; and the conversion unit converts the image shift amount to the defocus amount based upon the value indicating the ratio.

5. A focus detection device according to claim 1, wherein:
the lens systems are micro-lenses each disposed in correspondence to each of pairs of light-receiving elements constituting the pair of light-receiving element arrays.

6. A focus detection device according to claim 1, wherein:
the lens systems are a pair of image reforming lenses; and
an optical image formed via the photographic optical system is reformed near each of the pair of light-receiving element arrays via the pair of image reforming lenses.

7. An image-capturing apparatus, comprising:
a focus detection device according to claim 4;
an image sensor that includes a plurality of image-capturing light-receiving elements with three different sets of spectral sensitivity characteristics corresponding to a first wavelength band, a second wavelength band and a third wavelength band, which receive the transmitted light and output image signals corresponding to the three different sets of spectral sensitivity characteristics, and at which the pair of light-receiving element arrays are arrayed; and
a correction unit that corrects the function value calculated by the function value calculation unit, based upon mean output values which each corresponds to each of the three different sets of spectral sensitivity characteristics and which indicate mean values of values output from the plurality of image-capturing light-receiving elements present within a nearby area around the pair of light-receiving element arrays on the image sensor, wherein:
the function value calculation unit calculates the function value corresponding to light assuming a central wavelength band among the first wavelength band, the second wavelength band and the third wavelength band.

8. A camera system, comprising:
a focus detection device; and
a photographic lens unit equipped with a photographic optical system and a storage unit, wherein:
the focus detection device includes;
a focus detection unit that includes a pair of light-receiving element arrays and lens systems, via which a pair of focus detection light fluxes obtained by pupil-splitting transmitted light transmitted through the photographic optical system are each guided to one of the pair of light-receiving element arrays, and detects an image shift amount based upon output signals output from the pair of light-receiving element arrays by adopting a split-pupil phase method;
an acquisition unit that obtains a plurality of sets of opening data pertaining to sizes and positions of a plurality of openings that restrict the transmitted light at the photographic optical system;
a gravitational center distance calculation unit that calculates a gravitational center distance between gravitational centers of a pair of overlapping areas where a pair of specific focus detection pupils determined in correspondence to the lens systems and the pair of light-receiving element arrays at the focus detection unit overlap an exit pupil of the photographic optical system; and
a conversion unit that converts the image shift amount to a defocus amount based upon a focus detection pupil distance from the lens systems to the pair of focus detection pupils and the gravitational center distance calculated by the gravitational center distance calculation unit;
the gravitational center distance calculation unit calculates the gravitational center distance by substituting, in a quadratic expression pertaining to variables representing positions of two intersection points at which a straight line passing through the gravitational centers of the pair of overlapping areas intersect an outer edge of the exit pupil of the photographic optical system, variable values, determined based upon the plurality of sets of opening data obtained by the acquisition unit and position data indicating a position at which focus detection is executed on the light-receiving element arrays, for the variables;
the quadratic expression includes the variables and a specific constant;
the plurality of sets of opening data and the specific constant are stored in the storage unit; and
when calculating the gravitational center distance, the gravitational center distance calculation unit reads out the specific constant from the storage unit.

9. A photographic lens unit, being included in a camera system according to claim 8.

10. A camera system, comprising:
a focus detection device; and
a photographic lens unit equipped with a photographic optical system and a storage unit, wherein:
the focus detection device includes;
a focus detection unit that includes a pair of light-receiving element arrays and lens systems, via which a pair of focus detection light fluxes obtained by pupil-splitting transmitted light transmitted through the photographic optical system are each guided to one of the pair of light-receiving element arrays, and detects an image shift amount based upon output signals output from the pair of light-receiving element arrays by adopting a split-pupil phase method;
an acquisition unit that obtains a plurality of sets of opening data pertaining to sizes and positions of a plurality of openings that restrict the transmitted light at the photographic optical system;
a function value calculation unit that calculates a function value pertaining to a gravitational center distance between gravitational centers of a pair of overlapping areas where a pair of specific focus detection pupils determined in correspondence to the lens systems and the pair of light-receiving element arrays at the focus detection unit overlap an exit pupil of the photographic optical system;
a distance calculation unit that calculates, based upon the plurality of sets of opening data obtained via the acquisition unit, an intersection point distance between two intersection points at which a straight line passing through the gravitational centers of the pair of overlapping areas intersect an outer edge of the exit pupil of the photographic optical system; and
a conversion unit that converts the image shift amount to a defocus amount based upon the function value calculated by the function value calculation unit,
the function value is a value indicating a ratio of a focus detection pupil distance from the lens systems to the pair of focus detection pupils and the gravitational center distance;
the function value calculation unit calculates the value indicating the ratio based upon the focus detection pupil distance, the intersection point distance and a specific constant;

the conversion unit converts the image shift amount to the defocus amount based upon the value indicating the ratio;

the plurality of sets of opening data and the specific constant are stored in the storage unit; and when calculating the value indicating the ratio, the function value calculation unit reads out the specific constant from the storage unit.

11. A photographic lens unit, being included in a camera system according to claim 10.

* * * * *